United States Patent
Lee et al.

(10) Patent No.: US 12,200,757 B2
(45) Date of Patent: Jan. 14, 2025

(54) METHOD AND DEVICE FOR OCCUPYING RESOURCES IN NEW RADIO (NR) VEHICLE-TO-EVERYTHING (V2X)

(71) Applicant: LG ELECTRONICS INC., Seoul (KR)

(72) Inventors: Jongyoul Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 669 days.

(21) Appl. No.: 17/264,123

(22) PCT Filed: Jul. 30, 2019

(86) PCT No.: PCT/KR2019/009487
§ 371 (c)(1),
(2) Date: Jan. 28, 2021

(87) PCT Pub. No.: WO2020/027548
PCT Pub. Date: Feb. 6, 2020

(65) Prior Publication Data
US 2021/0168861 A1    Jun. 3, 2021

(30) Foreign Application Priority Data

Jul. 30, 2018  (KR) ........................ 10-2018-0088873

(51) Int. Cl.
*H04W 74/0808* (2024.01)
*H04W 4/40* (2018.01)
*H04W 92/18* (2009.01)

(52) U.S. Cl.
CPC ......... *H04W 74/0808* (2013.01); *H04W 4/40* (2018.02); *H04W 92/18* (2013.01)

(58) Field of Classification Search
CPC .... H04W 74/0808; H04W 4/40; H04W 92/18
USPC ........................................................ 370/329
See application file for complete search history.

(56) References Cited

U.S. PATENT DOCUMENTS

| | | | |
|---|---|---|---|
| 11,297,600 B2 * | 4/2022 | Cai | H04W 72/541 |
| 11,523,372 B2 * | 12/2022 | Yu | H04W 74/0808 |
| 11,690,049 B2 * | 6/2023 | Zhang | H04W 72/542 |
| | | | 370/329 |

(Continued)

FOREIGN PATENT DOCUMENTS

| KR | 20180069866 | 6/2018 |
|---|---|---|
| WO | 2015122629 | 8/2015 |

(Continued)

OTHER PUBLICATIONS

PCT International Application No. PCT/KR2019/009487, International Search Report dated Oct. 28, 2019, 4 pages.

*Primary Examiner* — Mong-Thuy T Tran
(74) *Attorney, Agent, or Firm* — LEE, HONG, DEGERMAN, KANG & WAIMEY

(57) ABSTRACT

Provided are a method for transmitting sidelink information by means of a first device (100) and a device for supporting same in a wireless communication system. The method may comprise the steps of: determining a plurality of candidate resources on the basis of a threshold; selecting, from the plurality of candidate resources and in a specific time interval, a resource for transmitting sidelink information; and transmitting the sidelink information on the resource.

6 Claims, 32 Drawing Sheets

(56) References Cited

U.S. PATENT DOCUMENTS

| | | | |
|---|---|---|---|
| 2015/0334721 A1* | 11/2015 | Kim | H04W 72/02 |
| | | | 370/330 |
| 2016/0219566 A1* | 7/2016 | Jung | H04W 72/044 |
| 2016/0295624 A1* | 10/2016 | Novlan | H04L 67/12 |
| 2016/0345312 A1* | 11/2016 | Kim | H04W 72/0446 |
| 2017/0188391 A1* | 6/2017 | Rajagopal | H04W 74/0816 |
| 2018/0063816 A1* | 3/2018 | Gulati | H04W 72/02 |
| 2018/0176955 A1 | 6/2018 | Salem et al. | |
| 2018/0227971 A1* | 8/2018 | Yasukawa | H04W 76/14 |
| 2019/0053203 A1* | 2/2019 | Xu | H04W 88/04 |
| 2020/0059962 A1* | 2/2020 | Tejedor | H04W 76/14 |
| 2020/0296691 A1* | 9/2020 | Lee | H04W 52/383 |
| 2020/0383114 A1* | 12/2020 | Zhang | H04W 72/0446 |
| 2021/0045089 A1* | 2/2021 | Yu | H04W 74/0808 |
| 2021/0045155 A1* | 2/2021 | Shi | H04W 74/0808 |
| 2021/0099976 A1* | 4/2021 | Mueck | H04W 4/40 |

FOREIGN PATENT DOCUMENTS

| | | |
|---|---|---|
| WO | 2017116108 | 7/2017 |
| WO | 2018039079 | 3/2018 |

\* cited by examiner

FIG. 9
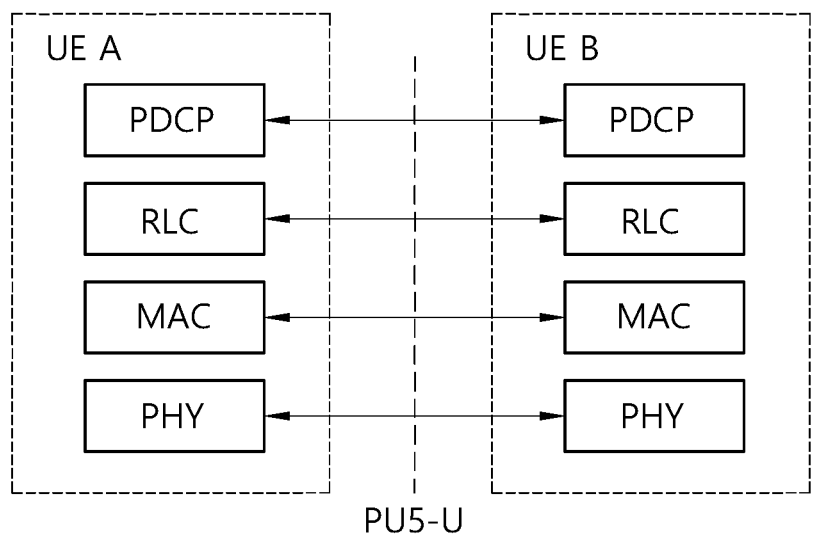
PU5-U
(a)
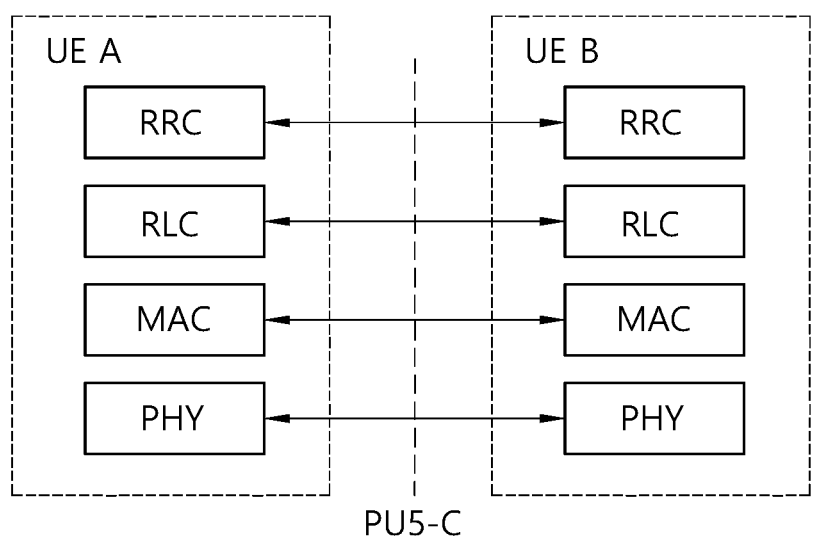
PU5-C
(b)

FIG. 10
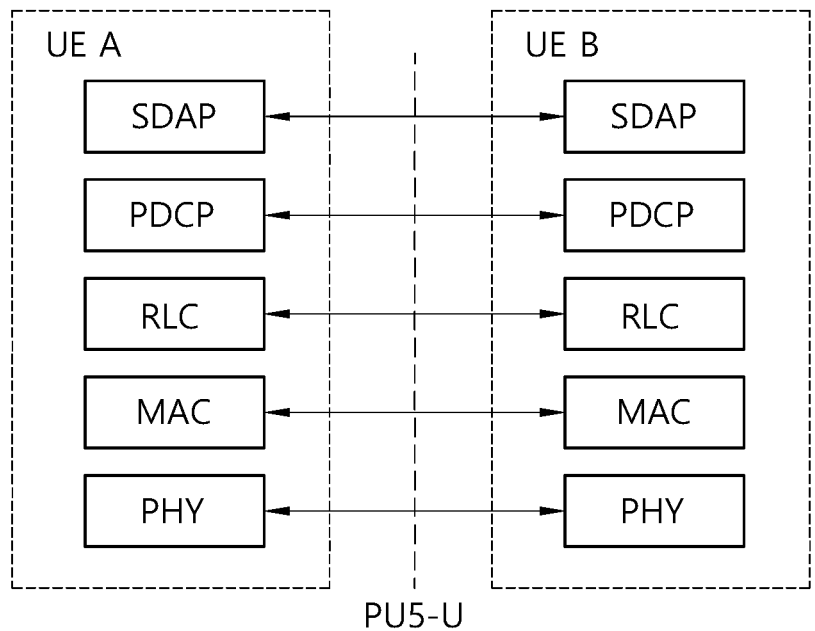
(a)
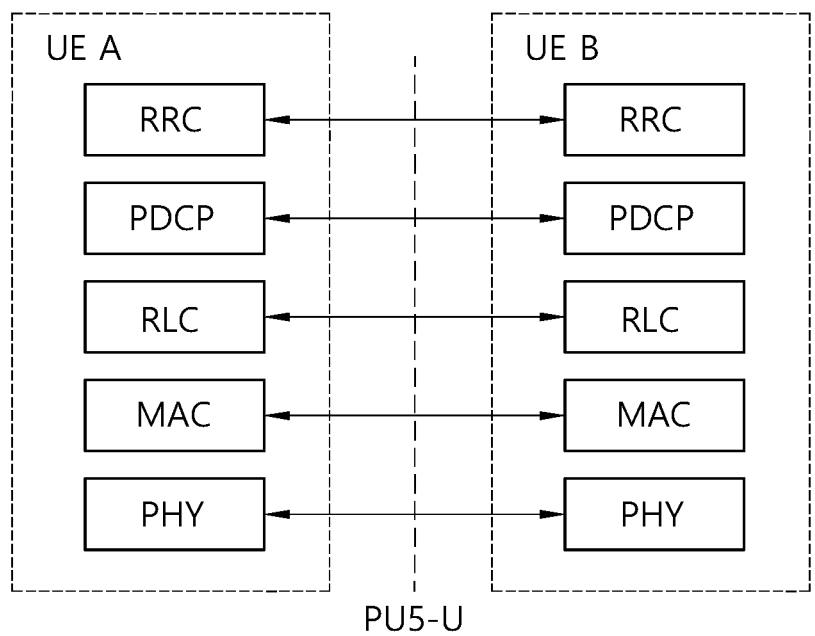
(b)

METHOD AND DEVICE FOR OCCUPYING RESOURCES IN NEW RADIO (NR) VEHICLE-TO-EVERYTHING (V2X)

CROSS-REFERENCE TO RELATED APPLICATIONS

This application is the National Stage filing under 35 U.S.C. 371 of International Application No. PCT/KR2019/009487, filed on Jul. 30, 2019, which claims the benefit of earlier filing date and right of priority to KR Application No. 10-2018-0088873, filed on Jul. 30, 2018, the contents of which is hereby incorporated by reference herein in its entirety.

BACKGROUND OF THE DISCLOSURE

Field of the Disclosure

The present disclosure is related to a wireless communication system.

Related Art

A wireless communication system is a multiple access system that supports communication of multiple users by sharing available system resources (e.g., a bandwidth, transmission power, and so on) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

FIG. 1 shows examples of 5G usage scenarios to which the technical features of the present disclosure can be applied. The 5G usage scenarios shown in FIG. 1 are only exemplary, and the technical features of the present disclosure can be applied to other 5G usage scenarios which are not shown in FIG. 1.

Referring to FIG. 1, the three main requirement areas of 5G include (1) enhanced mobile broadband (eMBB) domain, (2) massive machine type communication (mMTC) area, and (3) ultra-reliable and low latency communications (URLLC) area. Some usage cases may require multiple areas for optimization and, other usage cases may only focus on only one key performance indicator (KPI). 5G is to support these various usage cases in a flexible and reliable way.

eMBB focuses on across-the-board enhancements to the data rate, latency, user density, capacity and coverage of mobile broadband access. The eMBB aims approximately 10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special usage case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another usage case is augmented reality and information retrieval for entertainment. Here, augmented reality requires very low latency and instantaneous data amount.

mMTC is designed to enable communication between devices that are low-cost, massive in number and battery-driven, intended to support applications, such as smart metering, logistics, and field and body sensors. mMTC aims approximately 10 years on battery and/or approximately 1 million devices/$km^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims approximately 1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of usage cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many usage cases for mobile communications to vehicles. For example, entertainment for passengers demands high capacity and high mobile broadband at the same time. This is because future users will continue to expect high-quality connections regardless of their location and speed. Another usage case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters, such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important usage cases of mobile communications that enable tracking of inventory and packages anywhere using location-based information systems. Usage cases of logistics and freight tracking typically require low data rates, but require a large range and reliable location information.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Meanwhile, when traffic increases rapidly in NR sidelink or NR V2X, a UE needs to effectively occupy a resource. Therefore, there is a need to propose a method in which the UE effectively occupies the resource, and an apparatus supporting the method.

In an embodiment, there is provided a method of transmitting sidelink information by a first apparatus 100 in a wireless communication system. The method may include: determining a plurality of candidate resources, based on a threshold; selecting a resource for transmitting the sidelink information in a specific time duration, from among the plurality of candidate resources; and transmitting the sidelink information on the resource.

In another embodiment, there is provided a first apparatus 100 for transmitting sidelink information in a wireless communication system. The first apparatus 100 may include: one or more memories 104; one or more transceivers 106; and one or more processors 102 coupling the one or more memories 104 and the one or more transceivers 106. The one or more processors 102 may be configured to control: determining a plurality of candidate resources, based on a threshold; selecting a resource for transmitting the sidelink information in a specific time duration, from among the plurality of candidate resources; and transmitting the sidelink information on the resource by the one or more transceiver 106.

EFFECTS OF THE DISCLOSURE

In sidelink communication, a user equipment (UE) can efficiently occupy resources.

BRIEF DESCRIPTION OF THE DRAWINGS

FIG. 9 shows a protocol stack for a sidelink communication to which the exemplary embodiment of the present disclosure can be applied.

FIG. 10 shows a protocol stack for a sidelink communication to which the exemplary embodiment of the present disclosure can be applied.

DESCRIPTION OF EXEMPLARY EMBODIMENTS

In this document, the term "/" and "," should be interpreted to indicate "and/or". For instance, the expression "A/B" may mean "A and/or B". Further, "A, B" may mean "A and/or B". Further, "A/B/C" may mean "at least one of A, B, and/or C". Also, "A, B, C" may mean "at least one of A, B, and/or C".

Further, in the document, the term "or" should be interpreted to indicate "and/or". For instance, the expression "A or B" may comprise 1) only A, 2) only B, and/or 3) both A and B. In other words, the term "or" in this document should be interpreted to indicate "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A, which is a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
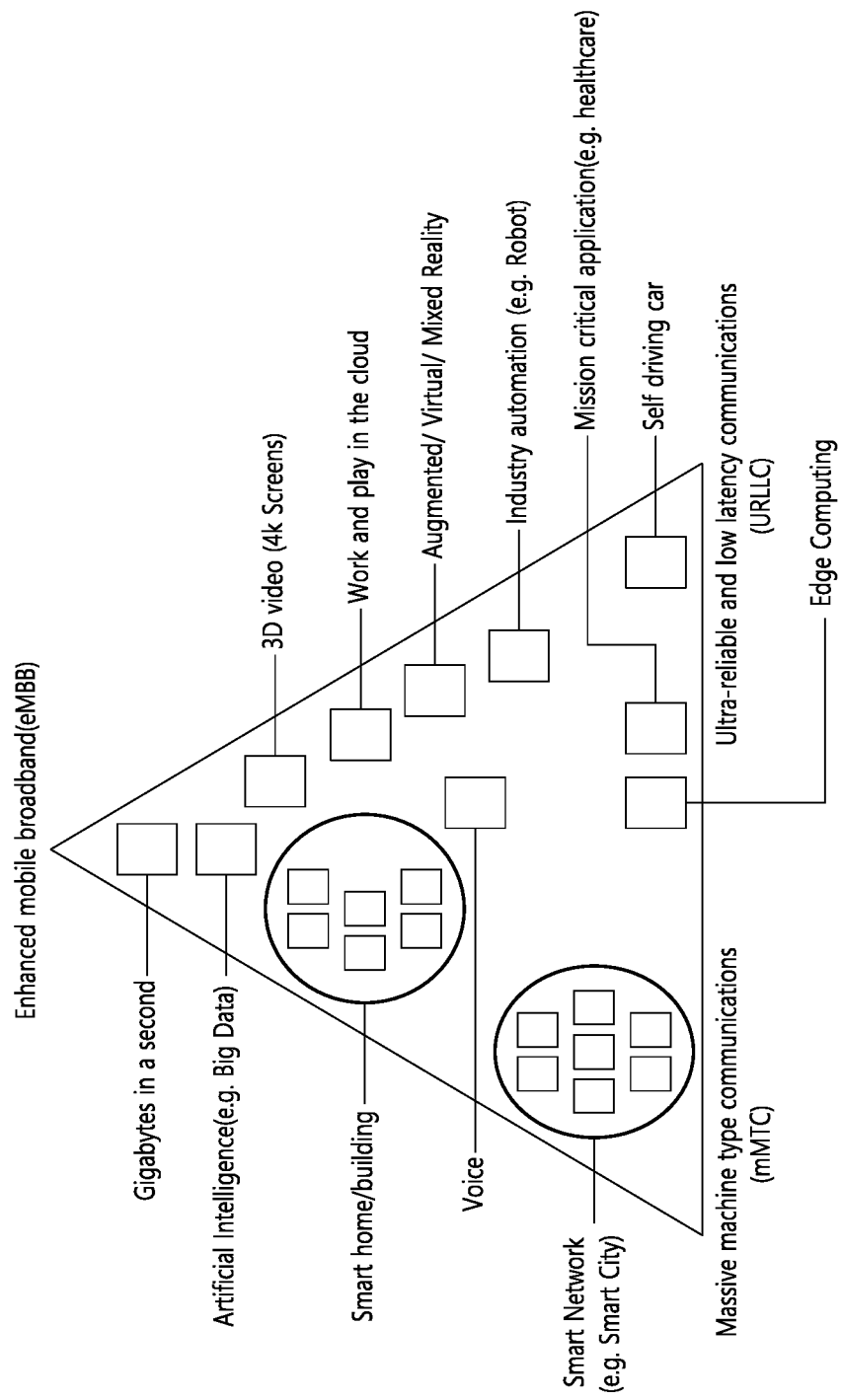
FIG. 1 shows examples of 5G usage scenarios to which the technical features of the present disclosure can be applied.
Figure 2:
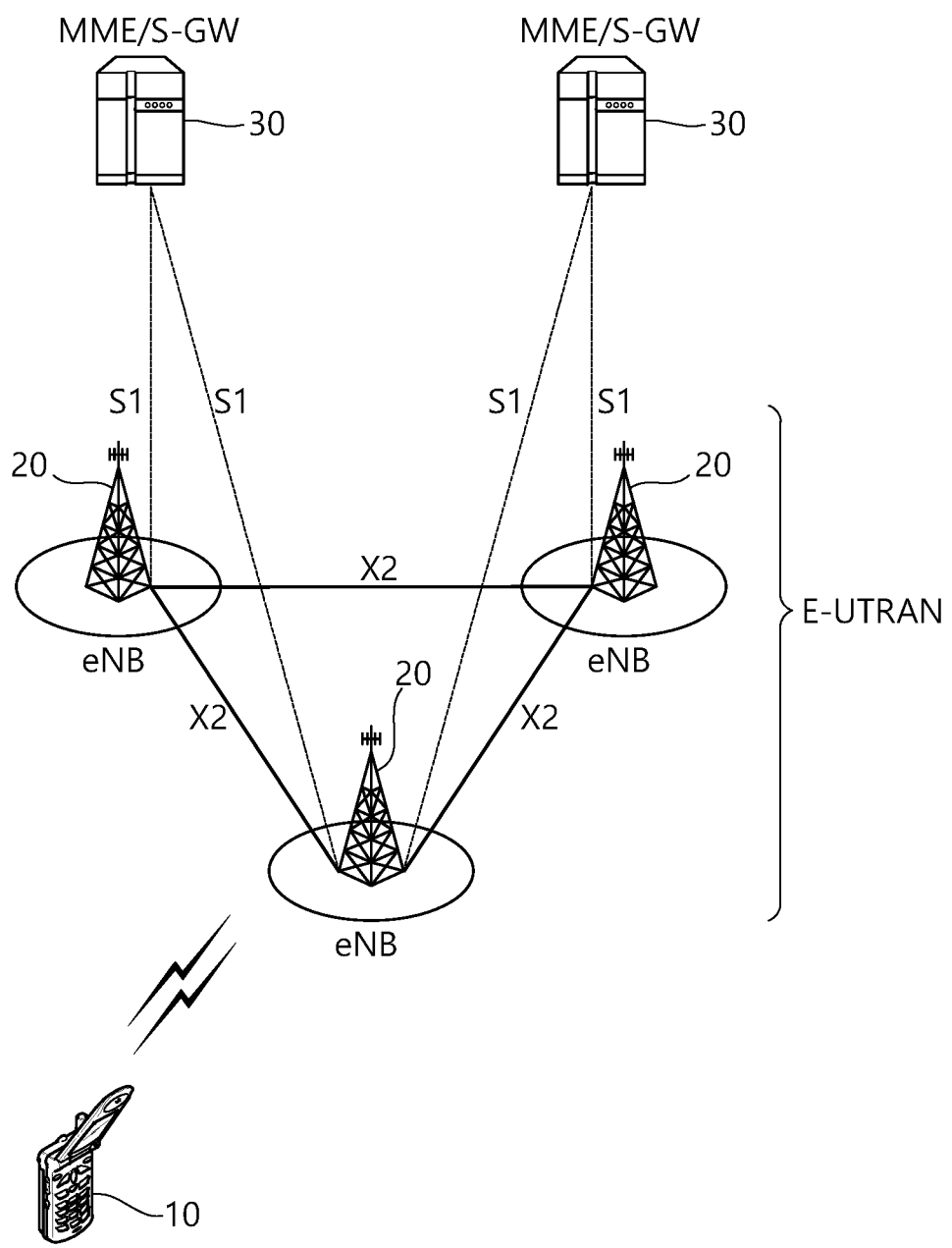
FIG. 2 shows a structure of an LTE system to which an exemplary embodiment of the present disclosure can be applied.

FIG. 2 shows a structure of an LTE system to which an exemplary embodiment of the present disclosure can be applied. This may also be referred to as an Evolved-UMTS Terrestrial Radio Access Network (E-UTRAN), or a Long Term Evolution (LTE)/LTE-A system.

Referring to FIG. 2, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicated with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an 51 interface. More specifically, the base stations (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a PDN as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 3:
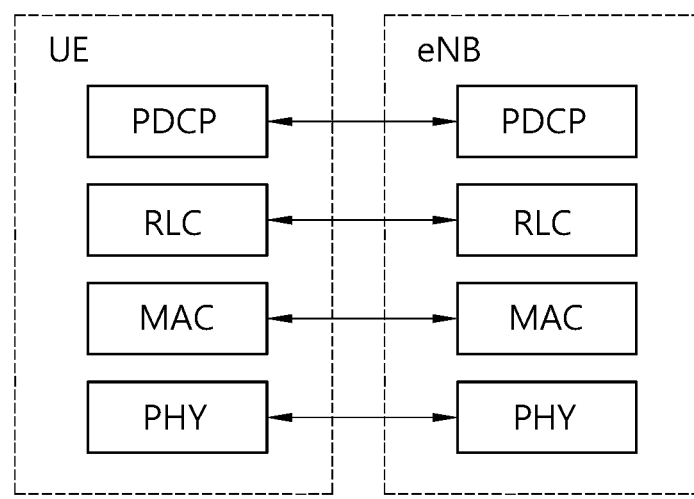
FIG. 3 shows a radio protocol architecture of a user plane to which an exemplary embodiment of the present disclosure can be applied.
Figure 4:
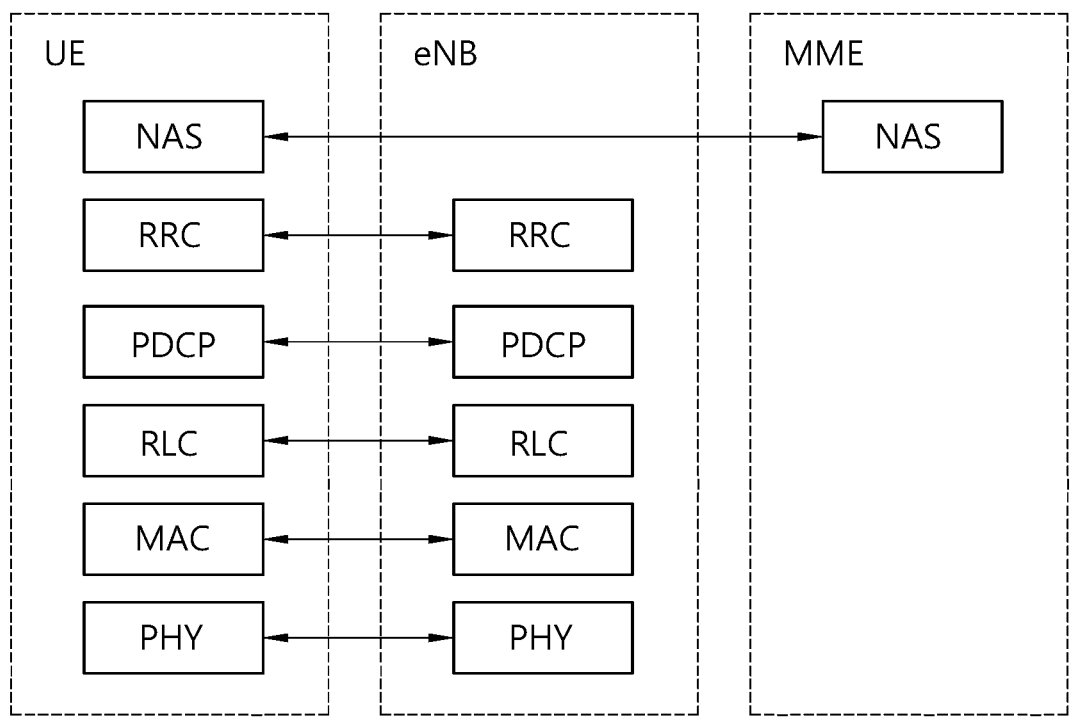
FIG. 4 shows a radio protocol architecture of a control plane to which an exemplary embodiment of the present disclosure can be applied.

FIG. 3 shows a radio protocol architecture of a user plane to which an exemplary embodiment of the present disclosure can be applied. FIG. 4 shows a radio protocol architecture of a control plane to which an exemplary embodiment of the present disclosure can be applied. The user plane is a protocol stack for user data transmission, and the control plane is a protocol stack for control signal transmission.

Referring to FIG. 3 and FIG. 4, a physical (PHY) layer belongs to the L1. A physical (PHY) layer provides an information transfer service to a high layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a high layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of RLC SDU. In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, PDCP layer) in order to transport data between the UE and the network.

Functions of a Packet Data Convergence Protocol (PDCP) in the user plane include transfer, header compression, and ciphering of user data. Functions of a Packet Data Convergence Protocol (PDCP) in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of subcarriers in the frequency domain. One subframe is configured of a plurality of OFDM symbols in the time domain. A resource block is configured of a plurality of OFDM symbols and a plurality of subcarriers in resource allocation units. Additionally, each subframe may use specific subcarriers of specific OFDM symbols (e.g., first OFDM symbol) of the corresponding subframe for a Physical Downlink Control Channel (PDCCH), i.e., L1/ L2 control channels. A Transmission Time Interval (TTI) refers to a unit time of a subframe transmission.

Figure 5:
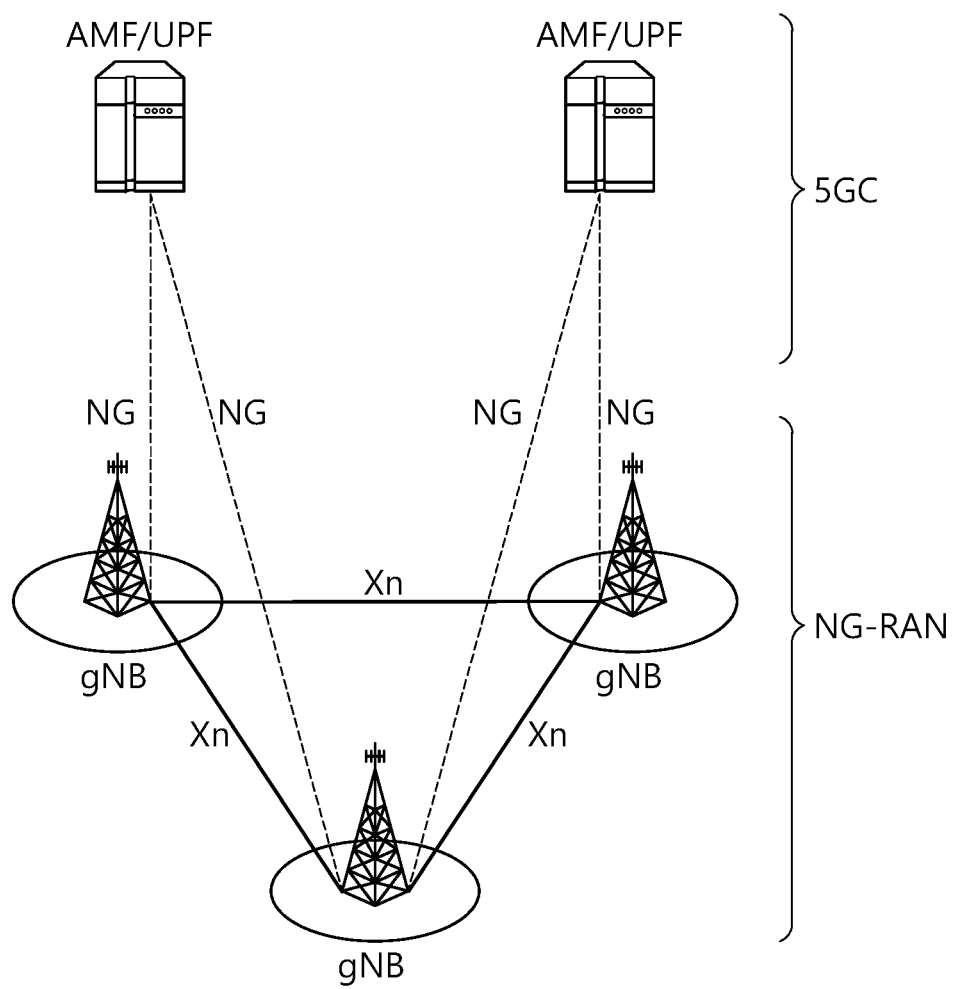
FIG. 5 shows a structure of an NR system to which an exemplary embodiment of the present disclosure can be applied.

FIG. 5 shows a structure of an NR system to which an exemplary embodiment of the present disclosure can be applied.

Referring to FIG. 5, an NG-RAN may include a gNB and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 6:
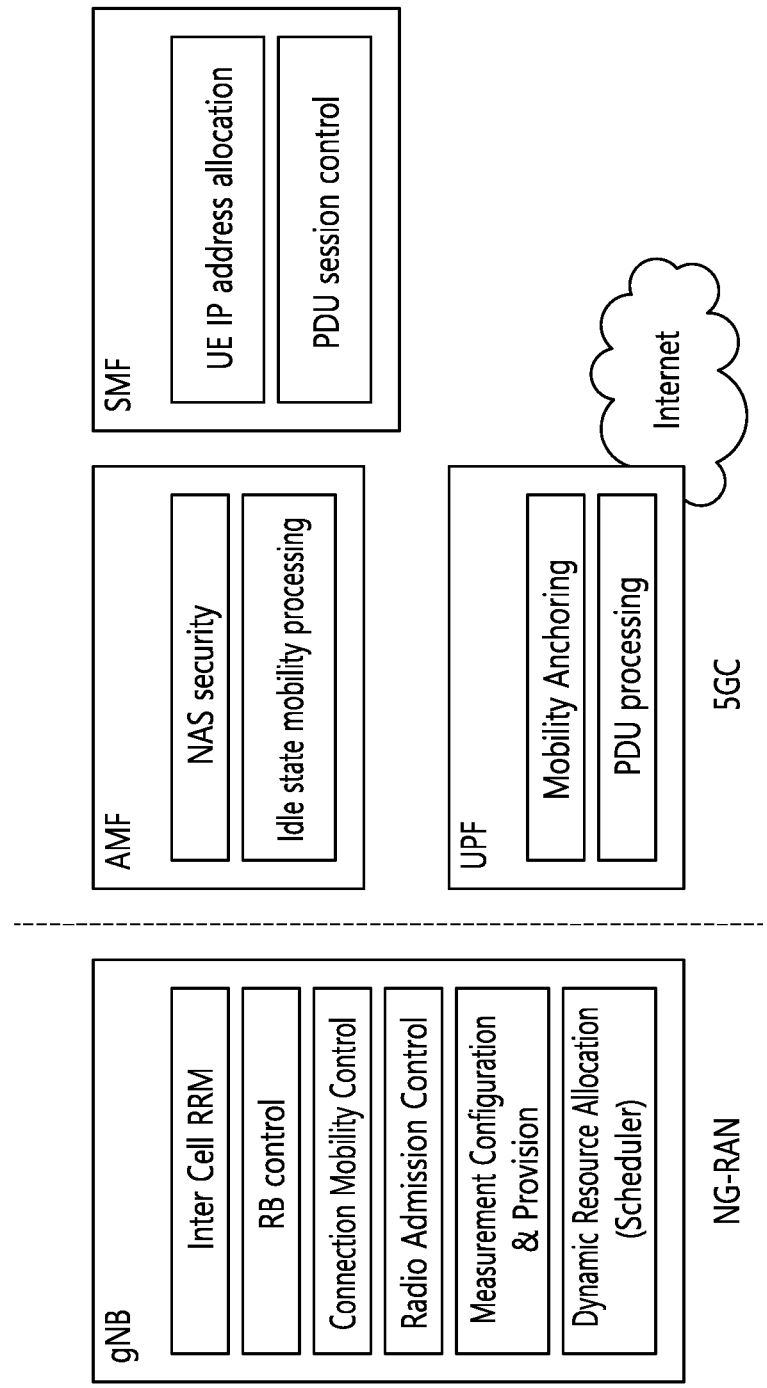
FIG. 6 shows a functional division between an NG-RAN and a 5GC to which an exemplary embodiment of the present disclosure can be applied.

FIG. 6 shows a functional division between an NG-RAN and a 5GC to which an exemplary embodiment of the present disclosure can be applied.

Referring to FIG. 6, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as NAS security, Idle state mobility processing, and so on. A UPF may provide functions, such as Mobility Anchoring, PDU processing, and so on. A Session Management Function (SMF) may provide functions, such as user equipment (UE) IP address allocation, PDU session control, and so on.

Figure 7:
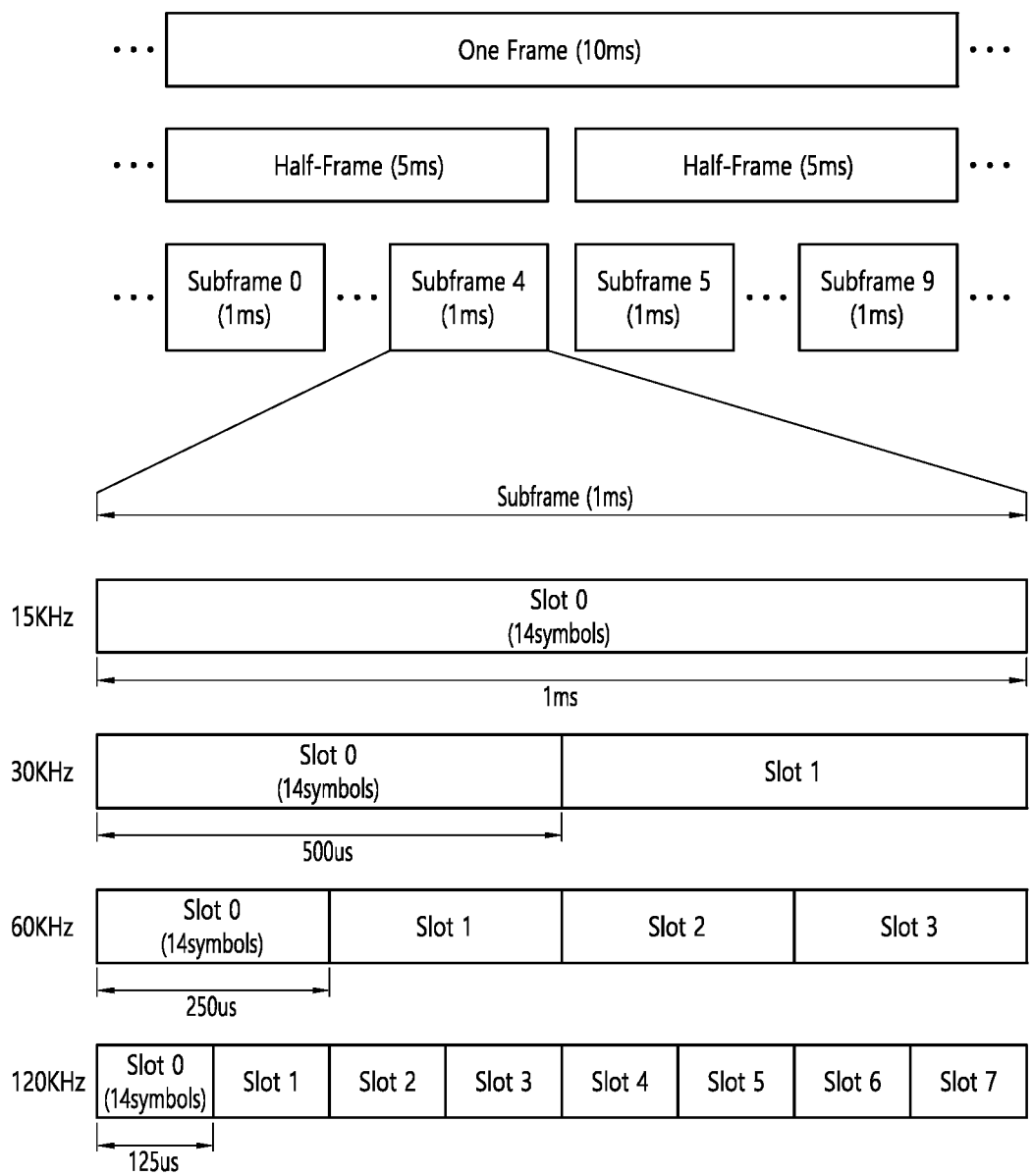
FIG. 7 shows a structure of a radio frame of an NR to which an exemplary embodiment of the present disclosure can be applied.

FIG. 7 shows a structure of a radio frame of an NR to which an exemplary embodiment of the present disclosure can be applied.

Referring to FIG. 7, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and an SC-FDMA symbol (or DFT-s-OFDM symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 8:
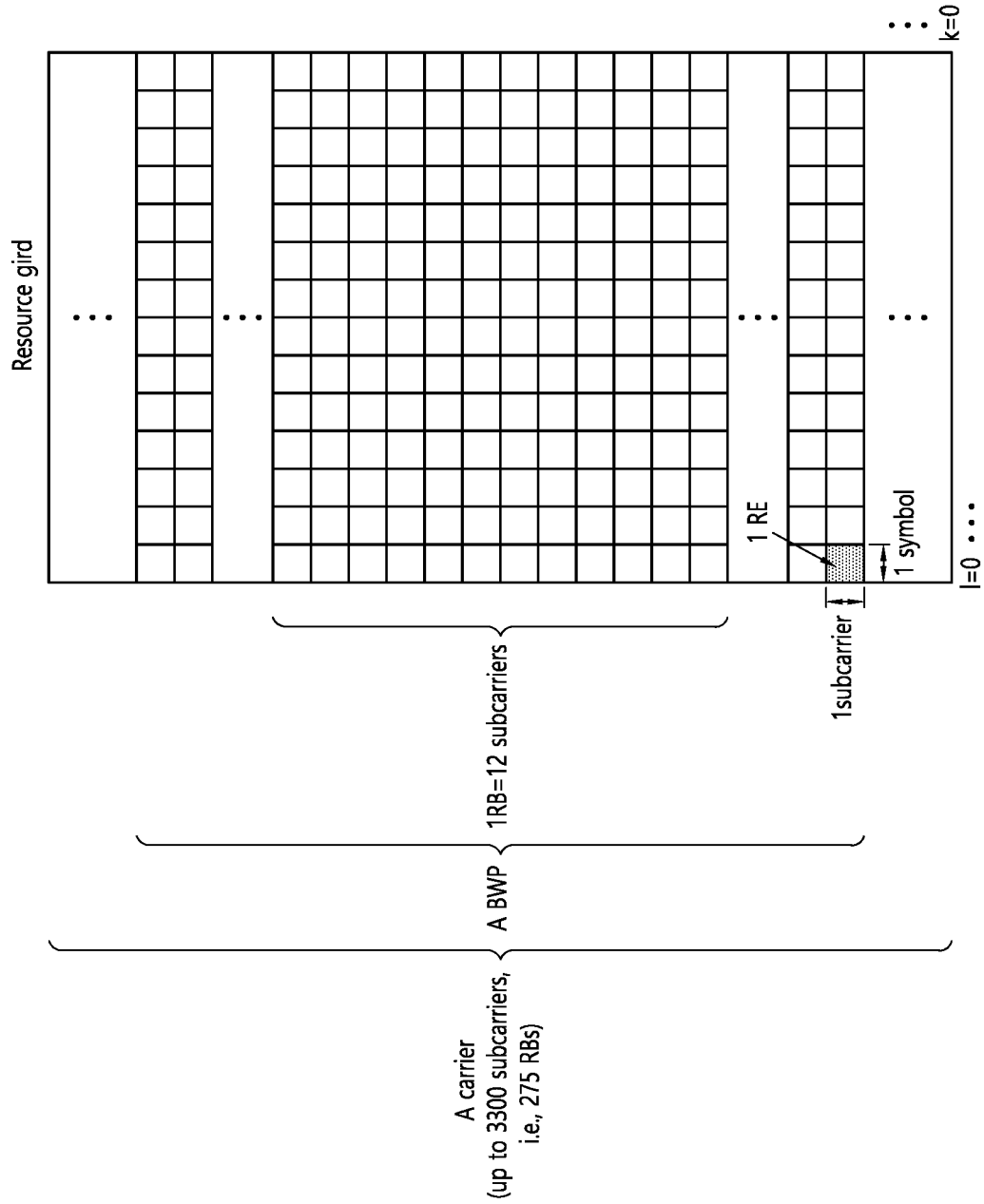
FIG. 8 shows a structure of a slot of an NR frame to which an exemplary embodiment of the present disclosure can be applied.

FIG. 8 shows a structure of a slot of an NR frame to which an exemplary embodiment of the present disclosure can be applied.

Referring to FIG. 8, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (P)RBs in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, V2X or sidelink communication will be described in detail.

FIG. 9 shows a protocol stack for a sidelink communication to which the exemplary embodiment of the present disclosure can be applied. More specifically, (a) of FIG. 9 represents a user plane protocol stack of LTE, and (b) of FIG. 9 represents a control plane protocol stack of LTE.

FIG. 10 shows a protocol stack for a sidelink communication to which the exemplary embodiment of the present disclosure can be applied. More specifically, (a) of FIG. 10 represents a user plane protocol stack of NR, and (b) of FIG. 10 represents a control plane protocol stack of NR.

Hereinafter, Sidelink Synchronization Signal (SLSS) and synchronization information will be described in detail.

SLSS is a sidelink specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may be a (broadcast) channel through which basic (system) information that should first be known by the user equipment (UE) before transmitting and receiving sidelink signals is transmitted. For example, the basic information may be information related to SLSS, a Duplex mode (DM), TDD UL/DL configuration, information related to a resource pool, application types related to SLSS, a subframe offset, broadcast information, and so on.

The S-PSS, the S-SSS, and the PSBCH may be included in a block format (e.g., a sidelink SS/PSBCH block, hereinafter referred to as S-SSB). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL BWP. And, a frequency position of the S-SSB may be (pre-)configured. Therefore, the UE is not required to perform a hypothesis detection in order to discover the S-SSB in the carrier.

Each SLSS may have a physical layer sidelink synchronization identity (ID), and the respective value may be equal to any one value ranging from 0 to 335. Depending upon any one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer sidelink synchronization ID values, values 0 to 167 may be values being used by a network, and values from 168 to 335 may be values being used outside of the network coverage.

Figure 11:
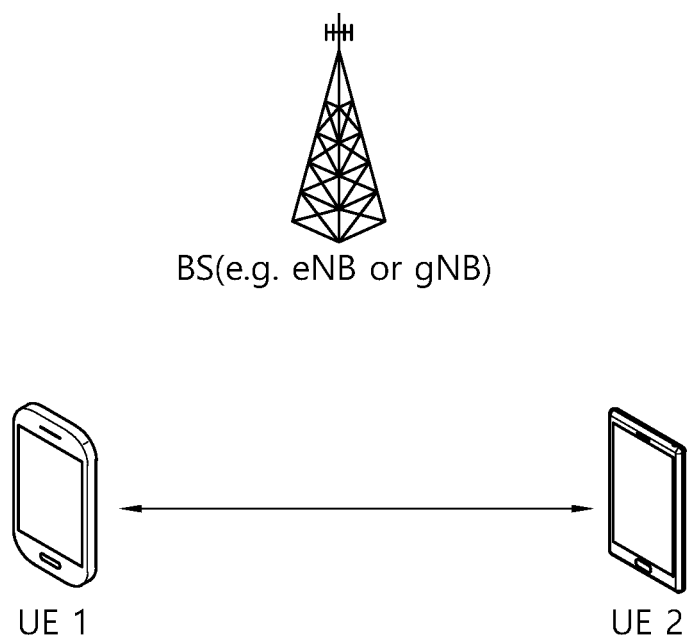
FIG. 11 shows a UE performing V2X or sidelink communication to which an exemplary embodiment of the present disclosure can be applied.

FIG. 11 shows a UE performing V2X or sidelink communication to which an exemplary embodiment of the present disclosure can be applied.

Referring to FIG. 11, in V2X/sidelink communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a sidelink signal by using the corresponding resource unit. User equipment 2 (UE2), which is a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its sidelink signal transmission.

Figure 12:
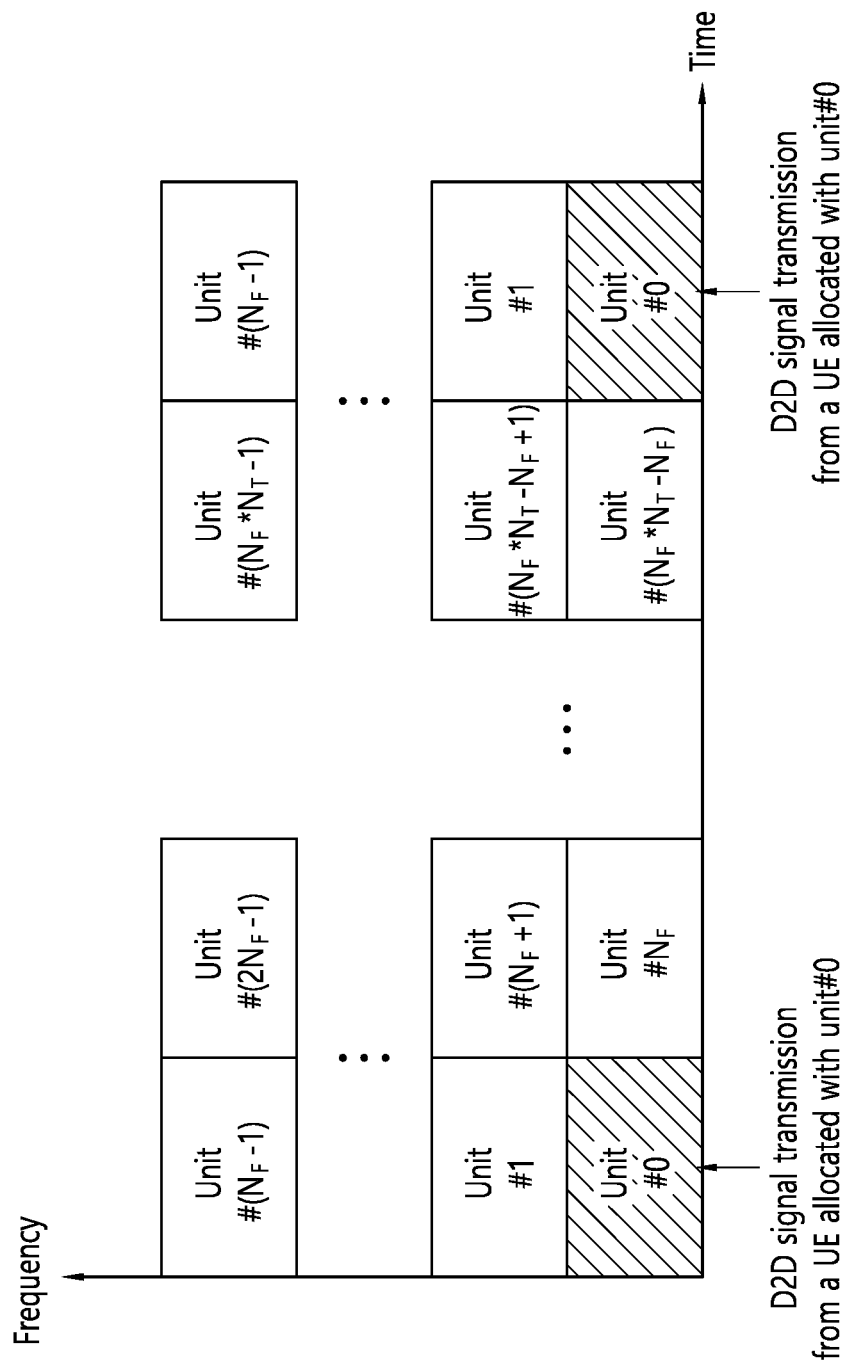
FIG. 12 shows an exemplary configuration of a resource unit to which an exemplary embodiment of the present disclosure can be applied.

FIG. 12 shows an exemplary configuration of a resource unit to which an exemplary embodiment of the present disclosure can be applied.

Referring to FIG. 12, the total frequency resources of the resource pool may be divided into $N_F$ number of resource units, the total time resources of the resource pool may be divided into $N_T$ number of resource units. Therefore, a total of $N_F*N_T$ number of resource units may be defined in the resource pool. FIG. 12 shows an example of a case where the corresponding resource pool is repeated at a cycle of NT number of subframes.

As shown in FIG. 12, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit sidelink signals.

The resource pool may be segmented to multiple types. For example, depending upon the content of a sidelink signal being transmitted from each resource pool, the resource pool may be divided as described below.

(1) Scheduling Assignment (SA) may be a signal including information, such as a position of a resource that is used for the transmission of a sidelink data channel, a Modulation and Coding Scheme (MCS) or MIMO transmission scheme needed for the modulation of other data channels, a Timing Advance (TA), and so on. The SA may also be multiplexed with sidelink data within the same resource unit and may then be transmitted, and, in this case, an SA resource pool may refer to a resource pool in which the SA is multiplexed with the sidelink data and then transmitted. The SA may also be referred to as a sidelink control channel.

(2) A Physical Sidelink Shared Channel (PSSCH) may be a resource pool that is used by a transmitting UE for transmitting user data. If the SA is multiplexed with sidelink data within the same resource unit and then transmitted, only a sidelink data channel excluding the SA information may be transmitted from the resource pool that is configured for the sidelink data channel. In other words, REs that were used for transmitting SA information within a separate resource unit of the SA resource pool may still be used for transmitting sidelink data from the resource pool of a sidelink data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described sidelink signal is the same, different resource pools may be used depending upon the transmission/reception attribute of the sidelink signal. For example, even if the same sidelink data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each sidelink signal within a subframe or a number of subframes being used for the transmission of one sidelink signal) of the sidelink signal, signal intensity from the base station, a transmitting power intensity (or level) of a sidelink UE, and so on.

Hereinafter, resource allocation in a sidelink will be described in detail.

Figure 13:
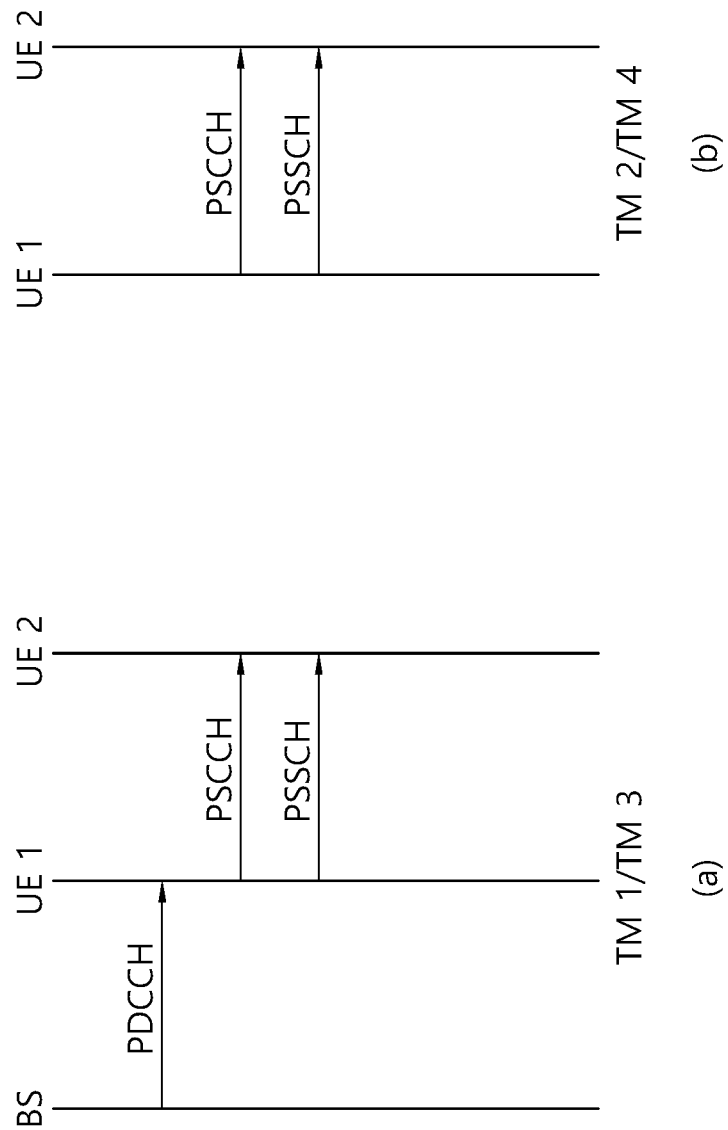
FIG. 13 shows user equipment (UE) operations according to a transmission mode (TM) being related to sidelink/V2X communication to which an exemplary embodiment of the present disclosure can be applied.

FIG. 13 shows user equipment (UE) operations according to a transmission mode (TM) being related to sidelink/V2X communication to which an exemplary embodiment of the present disclosure can be applied.

(a) of FIG. 13 represents UE operations being related to transmission mode 1 or transmission mode 3, and (b) of FIG. 13 represents UE operations being related to transmission mode 2 or transmission mode 4.

Referring to (a) of FIG. 13, in transmission modes 1/3, the base station performs resource scheduling to UE1 via PDCCH (more specifically, DCI), and UE1 performs sidelink/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE sidelink, transmission mode 1 may be applied to a general sidelink communication, and transmission mode 3 may be applied to a V2X sidelink communication.

Referring to (b) of FIG. 13, in transmission modes 2/4, the UE may schedule resources on its own. More specifically, in case of LTE sidelink, transmission mode 2 may be applied to a general sidelink communication, and the UE may select a resource from a predetermined resource pool on its own and may then perform sidelink operations. Transmission mode 4 may be applied to a V2X sidelink communication, and the UE may carry out a sensing/SA decoding procedure, and so on, and select a resource within a selection window on its own and may then perform V2X sidelink operations. After transmitting the SCI to UE2 via PSCCH, UE1 may transmit SCI-based data via PSSCH. Hereinafter, the transmission mode may be abbreviated to mode.

In case of NR sidelink, at least two types of sidelink resource allocation modes may be defined. In case of mode 1, the base station may schedule sidelink resources that are to be used for sidelink transmission. In case of mode 2, the user equipment (UE) may determine a sidelink transmission resource from sidelink resources that are configured by the base station/network or predetermined sidelink resources. The configured sidelink resources or the pre-determined sidelink resources may be a resource pool. For example, in case of mode 2, the UE may autonomously select a sidelink resource for transmission. For example, in case of mode 2, the UE may assist (or help) sidelink resource selection of another UE. For example, in case of mode 2, the UE may be configured with an NR configured grant for sidelink transmission. For example, in case of mode 2, the UE may schedule sidelink transmission of another UE. And, mode 2 may at least support reservation of sidelink resources for blind retransmission.

Procedures related to sensing and resource (re-)selection may be supported in resource allocation mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL RSRP measurement, which is based on SL DMRS. The resource (re-)selection procedure may use a result of the sensing procedure in order to determine the resource for the sidelink transmission.

Meanwhile, in the legacy V2X communication, traffic is mainly defined as periodic traffic, and a message generation period or latency requirement of the traffic is set to be at least 100 ms. In addition, in case of the periodic traffic, a size and the number of times of repetition of a message for simulation is specified such that a fixed-sized message is periodically transmitted 5 times in total, that is, 190 bytes are transmitted 4 times and 300 bytes are transmitted one time. Therefore, in case of the mode 3 or 4 of LTE V2X communication, a base station or a UE selects (/reserves) or re-selects a resource with a period greater than or equal to 100 ms according to a period of a message to be transmitted. More specifically, in case of the mode 4 of LTE V2X communication, a transmitting UE selects a transmission resource, based on a sensing operation.

Figure 14:
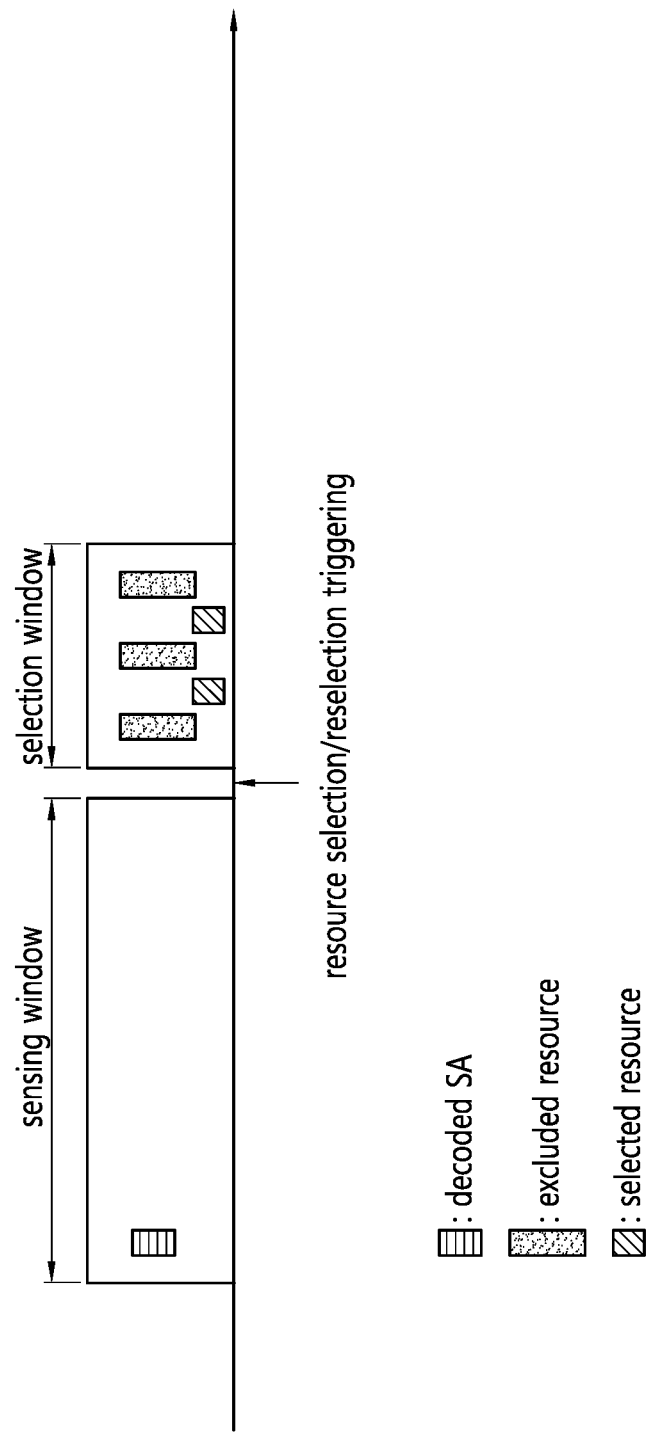
FIG. 14 shows an example of a resource selection method of a UE according to a mode 4 of LTE V2X communication to which an embodiment of the present disclosure is applicable.

FIG. 14 shows an example of a resource selection method of a UE according to a mode 4 of LTE V2X communication to which an embodiment of the present disclosure is applicable.

Referring to FIG. 14, the UE may perform a sensing operation in the sensing window, exclude resources in which a resource collision is expected in the selection window based on the result, and then randomly select a resource for V2X communication.

The sensing operation may perform an energy measurement operation for a channel and/or a predefined reference signal (RS) during a specific period (e.g., 1 second) before resource selection, and the UE may randomly select/(reserve) some of the candidate resources expected/selected not to be used by other UEs based on the measured value.

That is, the UE may perform a sensing operation in the sensing window and select a resource based on the sensing operation in the selection window. The sensing window and the selection window may mean a predetermined or preconfigured time and/or frequency resource.

For example, the UE may exclude some resources within the selection window based on scheduling assignment (SA) decoding and/or other conditions for the other UE. When the SA and data related thereto are transmitted in the same subframe, measurement of a demodulation reference signal (DMRS) of a PSSCH may be supported.

The UE may exclude resources indicated or reserved by decoded SA and resources in which PSSCH Reference Signal Received Power (RSRP) in the associated data resource is greater than or equal to a threshold.

The SA may include a ProSe per packet priority (PPPP) field, and the PPPP field may be configured with 3 bits. The PPPP field may carry priority information of a packet.

The threshold may be set or preset as a function of priority information. A value of the threshold may be changed in a range of [−128 dBm] to [0 dBm] in 2 dB units (i.e., granularity of 2 dB) and the threshold may further include positive infinity and negative infinity.

The threshold may be determined based on priority information of a transport block and priority information of the decoded SA, and 64 values may be determined in advance.

The UE for decoding SA at TTI*m+c in a sensing period may assume that the same frequency resource by the SA is reserved at TTI*m+d+P*i. Here, P may be fixed to 100 and may be a settable value. i may be selected within a range [0, 1, . . . , 10]. Selection of i may be a problem of UE implementation. i may be signaled through a 4-bit field in the SA.

The UE may exclude X when a semi-static candidate resource X having a period P*I collides with a resource Y reserved by SA of another UE and satisfies exclusion conditions through a threshold test.

When the number of the remaining resources after the process of excluding the resources as described above is less than 20% of the total resources in the selection window, the UE increases a value of the threshold (e.g., 3 dB), and then the resource exclusion process is performed again and thus the number of remaining resources after the process of excluding the resources is greater than 20% of the total resources in the selection window.

Thereafter, the UE may perform measurement with a period P for the remaining resources.

When the counter reaches a value of 0, the UE may maintain a current resource with a probability p and reset the counter, or reselect the resource with a probability p−1. P is a carrier specific parameter, and may be set/preset among [0, 0.2, 0.4, 0.6, 0.8].

The UE may measure/rank the remaining resources (e.g., PSSCH resources) based on total received energy and select some subset thereof. For instance, the subset may be a set of candidate resources having lowest received energy. For instance, a size of the subset may be 20% of total resources in the selection window.

Thereafter, the UE may randomly select a resource in the subset.

When the UE transmits a transport block in a subframe, the UE may select the consecutive M number of subchannels.

However, the above-described sensing/resource selection operation may be effective due to the characteristics of "periodicity" and "fixed size" of traffic in existing V2X communication. That is, because the UEs periodically select (/reserve) resources, the transmitting UE could predict resources expected to be periodically selected by the other UEs through a sensing operation. That is, PSSCH-RSRP and S-RSSI values observed (/measured) by the transmitting UE through a sensing operation during the past specific section include periodicity of other UEs and the transmitting UE in which, for example, a message generation period (or delay requirement) is 100 ms based on periodicity may select the best resource based on sensing and use the selected resource until resource reselection is triggered at a period of 100 ms. Therefore, the sensing operation at a system level is to minimize a collision with resources previously periodically occupied by other UEs by reflecting the past resource occupancy state rather than a resource selection time point.

However, in services (e.g., vehicles platooning, information sharing for automated driving, remote driving, etc.) considered in enhanced V2X (e.g., NR V2X or eV2X) communication, traffic of as little as four times and as much as about twenty times, compared with an amount of existing traffic may be generated. Further, the traffic may be aperiodic. In such traffic having aperiodic and variable sizes, existing sensing-based resource selection may not be effective. In the case of aperiodic/variable traffic, it is difficult to predict resource allocation of other UEs and thus when a sensing-based resource selection method is applied, the probability of collision occurrence between resources of other UEs and selection resources of a transmitting UE increases.

Considering this aspect, hereinafter, in NR V2X communication or eV2X communication, a method in which a UE selects a resource, based on a dynamic threshold, and an apparatus supporting the method are proposed according to an embodiment of the present disclosure.

The transmitting UE (or AP) may use a carrier sense multiple access (CSMA) method belonging to a random access method among protocols for accessing to a shared wireless channel. Here, the CSMA detects a channel (or carrier) before transmission in a principle of List before Talk (LBT), which reduces the possibility of collision with other transmitting UEs.

More specifically, in the CSMA/collision avoidance (CA) method, the transmitting UE observes a channel before transmitting data, and determines whether the channel is in an idle state based on Clear Channel Assessment (CCA), and if the channel is in an idle state, the transmitting UE reduces the selected random counter and if the channel is in a busy state, the transmitting UE maintains the random counter. When the random counter becomes 0 by repeating such a process, the transmitting UE transmits data and resets the random counter when NACK comes (or ACK does not come) from the receiving UE after transmitting data and thus performs the above process. In this case, in order to further prevent the collision, the transmitting UE may increase exponentially a selection range of the random counter. That is, the transmitting UE avoids a collision with a method of transmitting data after waiting for a time as long as the random counter by reducing the random counter in the case of idle and by increasing the random counter in the case of busy.

CCA includes carrier sense (CCA-CS) and energy detection (CCA-ED). When a receiver detects and decodes a preamble signal to detect another preamble signal, the CCA-CS is a method of reporting the received frame to an upper layer in a busy state with a length as long as a length field of a physical layer convergence protocol (PLCP) header indicates.

However, the CCA-ED determines that the channel is busy when the measured RSSI value is larger than the threshold based on a fixed threshold determined based on intensity of the current signals. The CCA-CS determines whether the channel is in a busy status during an accurate length interval, whereas the CCA-ED determines whether the channel is in a busy status by comparing with a predefined threshold at every slot time.

For example, in Wi-Fi, because interference does not come relatively consistently, the channel is occupied by determining whether the channel is in an idle/busy status based on a fixed threshold calculated using only current signal intensity (CCA-ED).

However, in the OFDM system like LTE, an influence of interference according to inter-symbol interference and co-channel interference is not only large, but also in a congestion environment, interference between the UEs and collisions of resource selection have a significant impact on performance degradation and thus another resource allocation method is needed. For this reason, for example, in sidelink transmission for V2X in which the BS does not currently involve, resource allocation through sensing is performed.

In aperiodic/variable traffic, efficient resource allocation is available in a kind of "hybrid" method by appropriately using the resource allocation method based on the past situation like the aforementioned CCA method and sensing operation. That is, interference is considered by reflecting the past channel state, and dynamic resource allocation is possible at every hour or shorter period for aperiodic traffic.

In frequent interference and irregular systems, past channel information prior to resource selection is also required. Accordingly, there is proposed a method of dynamically selecting resources at every TTI or a specific short duration based on a CCA threshold sequentially dynamically changed by reflecting past channel information.

Figure 15:
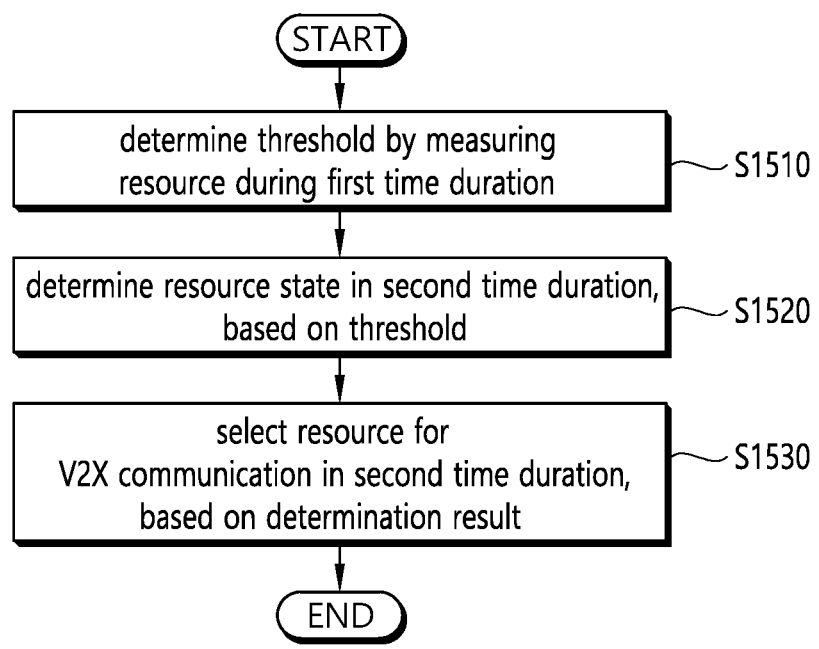
FIG. 15 shows a resource selection method of a UE according to an embodiment of the present disclosure.

FIG. 15 shows a resource selection method of a UE according to an embodiment of the present disclosure.

Referring to FIG. 15, in step S1510, a UE may measure a resource during a first time duration to determine a threshold (also referred to as a CCA threshold). In step S1520, the UE may determine a resource state in a second time duration, based on the threshold. In step S1530, the UE may select a resource for V2X communication in the second time duration, based on the determination result.

Hereinafter, each step of FIG. 15 will be described in detail.

The present disclosure may be referred to as a kind of CCA-ED method, which requires a predefined CCA threshold.

According to an embodiment of the present disclosure, the threshold may be determined dependent on priority information delivered with a predefined channel and/or a priority or latency requirement and reliability of the packet. Alternatively, the threshold may be a function of a channel busy ratio (CBR). For example, when a traffic load in coverage is high, a narrow target range is a general V2X attribute, and in this case, a relatively high interference resource may be used, and in contrast, when a traffic load is low, in order to satisfy a long target range, relatively low interference resources should be used. The UE may determine information about the traffic load by measuring the CBR to use the information in order to determine the threshold.

Specifically, the threshold may be determined as follows.

(1) a value raised by a predefined specific dB based on an RSSI value to be a boundary that satisfies a predefined specific ratio (e.g., lower x % or higher x %) or a boundary value thereof in a set of RSSIs measured at every resource pool (or per resource unit, sub-channel, resource element, or full band) during a predefined specific period (e.g., 1 second).

That is, a received signal strength indicator (RSSI) is measured in each of candidate resources for the V2X communication during a first time interval, and a value corresponding to a lower x or upper x (here, x is a natural number) % among RSSI values measured for each of the candidate resources may be determined as the threshold.

Here, a resource to be a target of the RSSI set may be defined in advance or may sequentially vary.

The channel monitoring process (e.g., RSSI measurement and RSSI set determination) may be always monitored regardless of resource selection triggering, and thus calculate the CCA threshold at any time based on the past.

A ratio of x % may be defined in advance, and a corresponding value may vary according to PPPP or a service type (e.g., application ID, destination ID). For example, a packet having high PPPP may lower a value of x and thus a resource with less interference may be selected. For example, when an overall channel condition is good based on the CBR, a value of x may be increased to increase a selection width of resources.

In the case of too much interference, in order to prevent an attempt of resource selection, a threshold may have an upper limit or a lower limit.

(2) In order to satisfy a specific ratio (e.g., lower x % or higher x %) of the RSSI set defined in the above (1) according to predefined receiver sensitivity or modulation and coding rate sensitivity, the threshold may be defined as a value increased by a specific dB (e.g., a value greater by 20 dB than −82 dBm, which is the minimum sensitivity for modulation and coding rate in a primary 20 MHz channel). In this way, predefined receiver sensitivity may be dynamically adjusted by dB in which past channel conditions are reflected.

A process of obtaining a threshold in a situation where a resource pool is given as illustrated in FIG. 12 will be described in more detail.

It is assumed that the UE determines an idle/busy status of resources by measuring an RSSI of the past $N_T$ number of time units in a situation in which a resource pool having a structure illustrated in FIG. 12 is given. Therefore, the UE has the total $N_T*N_F$ number of resources in an RSSI measurement set using when determining an idle/busy status of each resource at a specific time point and measures an RSSI of each resource. RSSIs measured in each of the $N_T$*NF number of resources may be aligned, and then for example, a value to be a boundary of lower 20% may be determined as a threshold of IDLE/BUSY.

For example, when the UE determines whether the resource (or channel) is in an idle or busy status at a specific time t, it is assumed that it was observed that an RSSI distribution of the resources measured during the past NT time is uniform distribution at [−100 dBm, −50 dBm] section. Accordingly, a threshold on whether a state of resources used by the UE at a time point t is idle/busy is −90 dBm, which is a boundary of lower 20%.

As a time passes, when the UE again determines whether the resource (or channel) is in an idle/busy status at a time point t+x, an overall system load is increased and thus it is assumed that it was observed that an RSSI distribution of the resource measured during the past $N_T$ time is a uniform distribution in [−80 dBm, 0 dBm] section. Therefore, in this case, a threshold on whether a resource is in an idle/busy status is −64 dBm, which is a boundary of lower 20% on this distribution. Eventually, at a time point t+x, a system load is increased and thus overall interference is increased, and in such a situation, the threshold is raised and thus even if some interference occurs, an effect of attempting to use a relatively good resource occurs.

Figure 16:
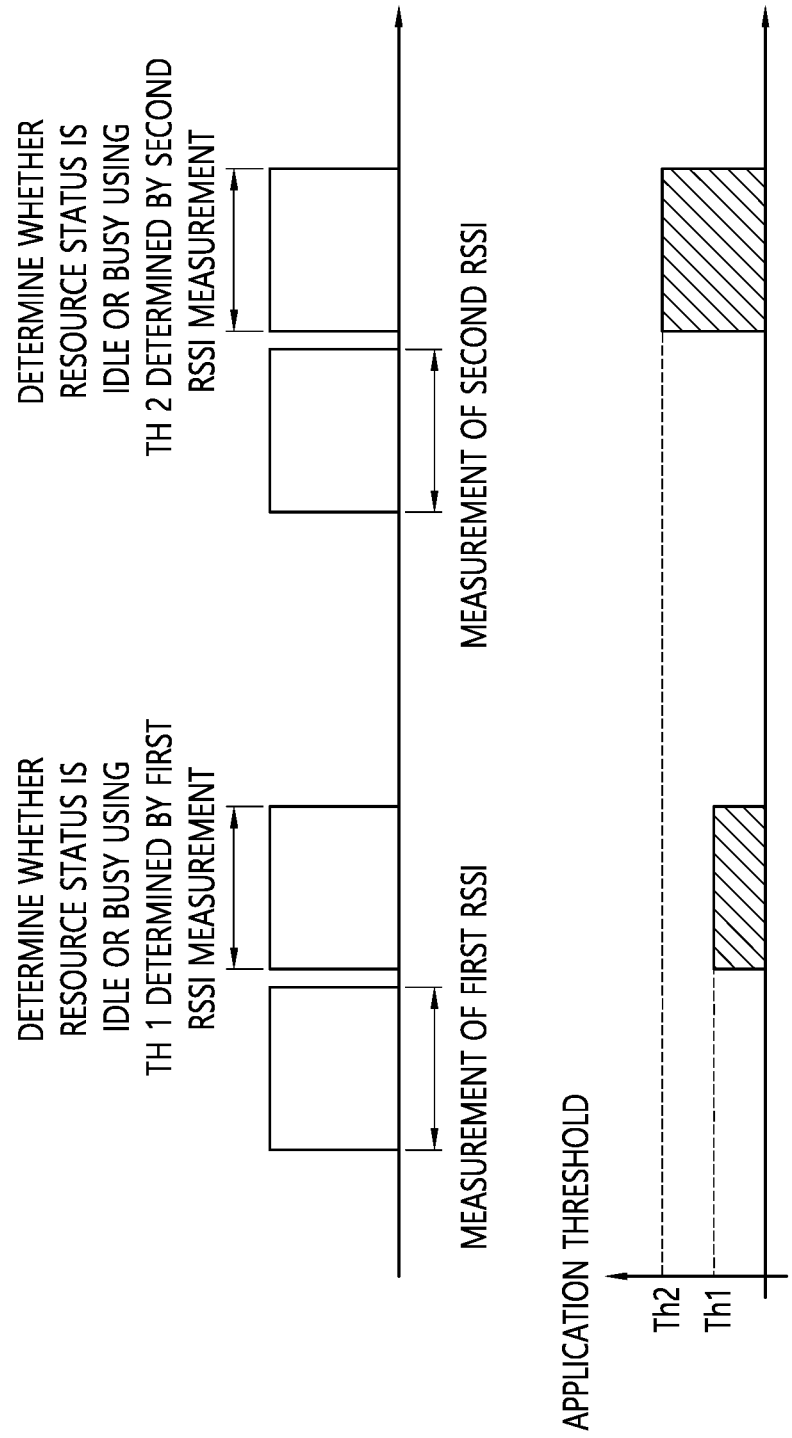
FIG. 16 shows a specific example of resource selection according to the present disclosure.

FIG. 16 shows a specific example of resource selection according to the present disclosure.

Referring to FIG. 16, the UE measures a first RSSI in a specific section. Thereafter, the UE determines whether a resource (or channel) state is idle or busy using a threshold Th 1 determined by measurement of the first RSSI. If a distribution of the first RSSI measured during the specific interval is uniform in [−100 dBm, −50 dBm] section, the threshold Th 1 may be, for example, −90 dBm, which is a boundary of lower 20% of the RSSI distribution.

After a certain time has elapsed, the UE measures a second RSSI in a specific section. Thereafter, the UE determines whether a resource (or channel) state is idle or busy using a threshold Th 2 determined by measurement of the second RSSI. For example, it is assumed that an overall system load is increased and thus a distribution of the second RSSI measurement result is uniform in [−80 dBm, 0 dBm] section. Therefore, in this case, the threshold Th 2 on whether the channel state is idle/busy may be −64 dBm, which is a boundary of lower 20% in the distribution.

Hereinafter, a description will be given on a method of selecting a resource based on the CCA-threshold defined above.

(1) The UE triggered by resource (re)selection may select randomly (or in random order) a resource (or resource unit, data pool, subchannel, RE, or full band) determined to an idle state in a current frame based on the CCA threshold defined above. The randomly selected resource may be reserved on the frequency/time axis as much as possible in the size of a packet to be transmitted, and the reserved information may be notified to other UEs through a predefined channel.

(2) The transmitting UE may select randomly (or in rank order) a resource (or resource unit, data pool, subchannel, RE, or full band) determined to an idle state in a current frame based on the CCA threshold defined above and then reevaluate the resource for a predetermined time without using the resource.

The method of re-evaluation is, for example, a method of evaluating the selected resource at every TTI or at a specific short duration on the same time axis, reducing a preselected random counter in case of idle, and using the resource, if a counter value is finally 0. When the case of busy occurs while reducing the random counter, the existing random counter may be maintained and a new random counter may be defined. In this manner, collisions between UEs that simultaneously select the same resource may be more prevented.

Here, the CCA threshold used in the random counter method may determine a CCA threshold based on observation up to that time point when resource allocation is started by generation of a packet, until the corresponding packet is transmitted (or until the counter is ended), the threshold may be maintained, or the threshold may be updated at every TTI or at a specific short duration while backing off.

A method of generating a random counter will be described. In a congestion situation, multiple UEs may attempt to preempt the same resource, and this may cause performance degradation due to a collision. Therefore, counter generation may take into account a priority, latency requirement, and reliability of the CBR or a packet to be currently sent. For example, if the CBR is high, a generation window of the counter value may be increased, and a counter generation window may be reduced for a packet having a high priority.

A process of obtaining a more optimal CCA threshold than the above method will be described.

In the above description, in order to reflect past channel conditions, idle/busy determination was made for all candidates of a current resource selection time using CCA thresholds extracted from past RSSI monitoring sets. Implementation complexity is higher than that of the proposed method, but the following method may be used in a more optimal method.

Figure 17:
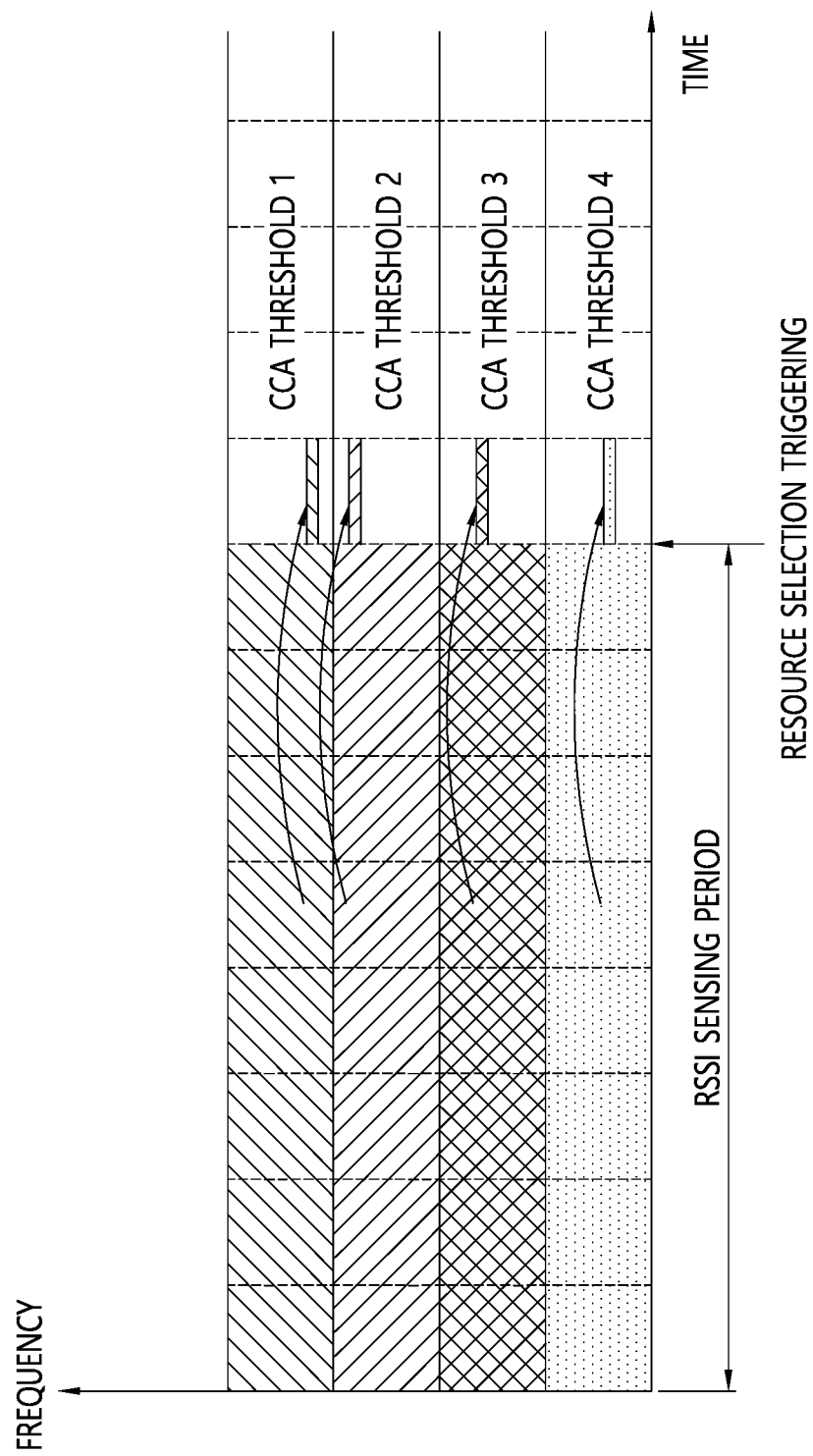
FIG. 17 shows another example of extracting a threshold of the UE according to the present disclosure.

FIG. 17 shows another example of extracting a threshold by the UE according to the present disclosure.

Referring to FIG. 17, in an RSSI sensing period, RSSI sensing may be performed for each resource set separated with a frequency axis, and different CCA thresholds may be extracted for each resource set.

That is, there is each resource set separated on the frequency axis (here, the unit of frequency may be various, such as 1 RE, 1RB, a subchannel, and a plurality of subchannels), and a value corresponding to the RSSI value of higher x % proposed above by each resource set may be extracted as a CCA threshold at each frequency (e.g., 1 RE, 1 RB, subchannel, and a plurality of subchannels). Therefore, at a resource selection triggering n time point, the UE may determine more optimally an idle/bus status of the resource (or channel) with different CCA thresholds for each frequency.

As an effect when applying different CCA thresholds to the frequency axis, performance degradation according to a frequency selective channel occurs in a V2X communication scenario with a large Doppler effect and idle/busy is determined with a CCA threshold in which frequency selection is reflected and thus evaluation is more stably available. When it is difficult to extract the CCA threshold in all sensing periods with high implementation complexity, a CCA threshold of each frequency may be generated with the RSSI value periodically extracted in the sensing period.

It may be regarded that the above-proposed resource selection method has advantages over existing resource selection methods (e.g., sensing) when a UE generating aperiodic/variable traffic is dominant or commonly distributed. Accordingly, the transmitting UE may select a resource selection method from the existing method and the proposed method according to the distribution of transmission traffic of the UEs in the coverage. For example, when a UE for transmitting a periodic message in the coverage is dominant, the existing resource selection method may be used, and in an opposite case, a proposed resource selection method may be used. Use traffic distribution information of the UE may be signaled to the UE with a predefined channel or may be signaled directly to the UE through a higher layer signal. Further, as an example, the UE may use an existing operation when the packet to be simply transmitted is periodic and use a proposed operation when the packet to be transmitted is aperiodic.

For example, in Wi-Fi, CCA is performed to occupy a full band, whereas the above-proposed method has the advantage of being able to frequency division multiplexed with the frequency axis (e.g., monitoring for each resource pool, each subchannel, and each resource element).

That is, in order to differentiate with CCA of Wi-Fi, the threshold test may be applied to other frequencies at the same time point. For such frequency division multiplexing (FDM), time synchronization of each UE should correspond and the same unit boundary should be maintained. The reason why time synchronization should correspond is that FDM through fast Fourier transform (FFT) is possible when a time boundary of each UE is the same. When FDM monitoring is supported, if a length of a time unit is too long, much monitoring (or sensing) delay may occur. When there are many delays to monitor with the frequency axis that do not sufficiently satisfy delay requirements, a length of a time interval for determining whether idle/busy should be fully short. Here, shortening of a time length between units may mean that transmission TTIs are reduced together (e.g., 0.5 symbol TTIs) or may mean that only TTIs for CCA are reduced. However, when transmitting a packet, several consecutive units may be used together.

The advantage of a method according to the present disclosure is a congested environment. When there is an "absolute" CCA threshold like existing Wi-Fi, there may be a large delay until actual transmission after resource selection triggering in a congested environment, but the proposed method determines a relatively good channel to an idle state with the "relative" CCA threshold and thus there is no continuous delay.

Another advantage is that when transmitting delay-sensitive packets, if a state of a channel is determined using a fixed threshold, for example, if the channel continuously has a value of a threshold or more due to a fully low threshold, a problem may occur that the packet is dropped, but when a dynamic threshold is applied, it is difficult that such a phenomenon occurs. Further, in Wi-Fi, CCA was performed to occupy the full band, but the proposed method has the advantage of being able to monitor and occupy a channel by being frequency division multiplexed with the frequency axis.

However, even if the dynamic threshold is used for resource selection of the UE as in the proposed method, a situation which is not good for resource selection of the UE may occur in a situation in which the traffic load increases excessively or steeply. For example, although a channel condition was good (e.g., a CBR measurement value is low, the number of V2X vehicles located in a cell is small, a traffic load is low, etc.) in the past, the traffic load may increase at present since excessive traffic occurs (e.g., traffic related to URLLC suddenly occurs). Alternatively, for example, although the channel situation was good in the past, the channel situation may become worse at present due to a rapid increase in the number of V2X vehicles. For example, when the UE moves from a freeway environment to an urban environment, or when a traffic jam suddenly occurs due to a traffic accident or the like in the freeway environment, the traffic load for the UE may increase excessively or steeply.

From a perspective of the UE, how the UE will recognize the environment changed as described above may be one issue. For example, the UE may periodically measure a channel (e.g., a CBR). In this case, based on a change amount between a previously measured CBR and a currently measured CBR, the UE may determine whether the traffic load increases rapidly. For example, if the change amount of the CBR is greater than or equal to or exceeds a specific value, the UE may determine that the traffic load increases rapidly. Alternatively, for example, a base station may broadcast cell-related channel environment information for each cell through system information to perform periodic or aperiodic transmission, or may signal intra-cell channel environment information to a specific UE. In addition, when channel environment information for each location is broadcast from the base station, the UE may determine whether the traffic load increases rapidly through its own location information.

Hereinafter, in the situation in which the traffic load increases excessively or steeply, a problem which may occur when the UE dynamically adjusts a threshold will be described in detail. For example, in an environment in which the traffic load is low, the UE may measure a channel state to determine a threshold, and the UE may configure the threshold (e.g., a CCA threshold) to be small, based on the measured channel state. However, the traffic load may increase rapidly at a timing at which the UE transmits data. As a result, there may be a problem in that a resource satisfying the threshold hardly exists, and the UE may not occupy a resource for transmission.

Further, in the situation in which the traffic load increases rapidly, there may also be a problem in that a latency requirement of a V2X service is not satisfied. For example, although the transmitting UE attempts to occupy a resource, based on the determined threshold (e.g., the CCA threshold), a latency may occur in the resource occupancy of the transmitting UE. Due to the latency, a situation may occur in which a latency budget of a packet to be transmitted by the transmitting UE is not satisfied, and eventually, the transmitting UE may have to drop the packet to be transmitted.

In order to solve the aforementioned problem, hereinafter, in NR V2X communication or eV2X communication, a method in which a UE selects a resource, based on a dynamic threshold, and an apparatus supporting the method are additionally proposed according to an embodiment of the present disclosure.

In order to solve the problem which occurs in the situation in which the traffic load increases rapidly, hereinafter, a method of controlling a CCA threshold is proposed according to an embodiment of the present disclosure.

According to an embodiment of the present disclosure, a first CCA threshold may be configured. In the present specification, the first CCA threshold may also be referred to as a configured CCA threshold. For example, the first CCA threshold may be pre-defined for a UE. Alternatively, for example, a base station may configure the first CCA threshold for the UE. Alternatively, for example, the base station may pre-configure the first CCA threshold for the UE. For example, the first CCA threshold may be signaled to the UE through a pre-defined channel. The UE may compare a CCA threshold (e.g., a dynamic CCA threshold) determined through the embodiment of FIG. 15 to FIG. 17 with the first CCA threshold (e.g., the configured CCA threshold). In addition, the UE may determine/configure a greater value between the determined CCA threshold and the configured threshold as the CCA threshold. According to the proposed rule, for example, if current traffic increases excessively, the UE may replace the CCA threshold (i.e., the dynamic CCA threshold) pre-determined to be low based on a history with a CCA threshold having a greater value between the two values. Therefore, the UE may select a candidate group of an occupied resource, based on the configured CCA threshold, and there may be an increase in the candidate group that can be selected by the UE.

According to an embodiment of the present disclosure, an available threshold range and a second CCA threshold may be configured. In the present specification, the second CCA threshold may also be referred to as an absolute CCA threshold. For example, the available threshold range and the second CCA threshold may be pre-defined for the UE. Alternatively, for example, the base station may configure the available threshold range and the second CCA threshold for the UE. Alternatively, for example, the base station may pre-configure the available threshold range and the second CCA threshold for the UE. For example, the available threshold range and the second CCA threshold may be signaled to the UE through a pre-defined channel. If the CCA threshold (i.e., the dynamic CCA threshold) determined through the embodiment of FIG. 15 to FIG. 17 is out of the available threshold range, the UE may determine/configure the second CCA threshold as the CCA threshold.

For example, it is assumed that the available threshold range is [−100 dBm, −50 dBm], and the second CCA is −70 dBm. In this case, if the CCA threshold (i.e., the dynamic CCA threshold) determined through the embodiment of FIG. 15 to FIG. 17 is −40 dBm, the dynamic CCA threshold may be out of the available threshold range. Therefore, the UE may determine/configure the second CCA as the CCA threshold. In addition, the UE may use the second CCA threshold to determine whether a channel is idle or busy. According to the proposed operation of the UE, even if a traffic load increases suddenly, since the UE configures a range of a threshold, it is possible to avoid a problem in that the threshold fluctuates excessively. However, according to the proposed operation of the UE, the method of determining the threshold of the UE, which is proposed according to the embodiment of FIG. 15 to FIG. 17, may not be completely satisfied. For example, although the UE determines that a current channel state is good, based on a history, and thus determines that a threshold is low, since the determined threshold is out of the available threshold range, the UE may determine/configure the threshold to a value higher than a threshold initially determined to be low. To avoid such a phenomenon, the UE may determine the CCA threshold by considering channel measurement information (e.g., CBR, CSI, CQI, etc.).

Further, for example, as described above, due to a tradeoff relationship between the dynamic CCA threshold and a load increase, a situation may occur in which a latency budget of a sidelink service is not satisfied. Therefore, according to an embodiment of the present disclosure, when it is near a latency limit of a packet to be currently transmitted by the UE, the UE may increase a value of the dynamic CCA threshold by a specific dB to increase the number of available resources, or the UE may occupy a resource for transmitting the packet at a corresponding timing even if there is a risk of a collision on the resource. For example, when a back-off time of a random counter is longer than a specific reference (or a specific time threshold), the UE may determine that it is near a latency limit of a packet to be currently transmitted. Alternatively, in order for the UE to occupy a resource, in a back-off process of the random counter, if the random counter is backed off in a time duration later than a specific timing according to a latency requirement (e.g., a specific 50% timing of the latency requirement), the UE may replace the dynamic CCA threshold with the second CCA threshold in the time duration. According to the proposed method, even if there is an increase in an influence of interference, there may be a decrease in a time delay required when the UE transmits a packet. Therefore, in the situation in which the traffic load increases rapidly, performance for the sidelink communication or V2X communication of the UE may be improved.

For example, the available threshold range, the second CCA threshold, or the specific dB value may be pre-defined for each UE (e.g., in a UE-specific manner). For example, the available threshold range, the second CCA threshold, or the specific dB value may be pre-defined for each cell (e.g., in a cell-specific manner). For example, the available threshold range, the second CCA threshold, or the specific dB value may be pre-defined for each resource pool (e.g., in a resource pool-specific manner). For example, a base station may configure the available threshold range, the second CCA threshold, or the specific dB value for the UE through a pre-defined channel. For example, the base station may pre-configure the available threshold range, the second CCA threshold, or the specific dB value for the UE through the pre-defined channel.

According to the method proposed above, the UE attempts to occupy a resource as soon as possible in order to decrease a latency even if there is a risk of interference power on the resource to be occupied. However, such an operation of the UE may cause a rather wrong result in an environment in which a congestion is severe. For example, a plurality of UEs may attempt to occupy the same resource having low interference power at the same timing. However, in this case, if the plurality of UEs transmit sidelink information through the same resource, a receiving UE may fail to receive the sidelink information. In the present specification, the sidelink information may include sidelink data, sidelink control information, a sidelink-related packet, a sidelink-related service, or the like. Therefore, there may be a need to propose a method of minimizing that the plurality of UEs occupy the same resource at the same timing.

Hereinafter, according to an embodiment of the present disclosure, a method of limiting resource occupancy of a transmitting UE and an apparatus supporting the method will be described.

Figure 18:
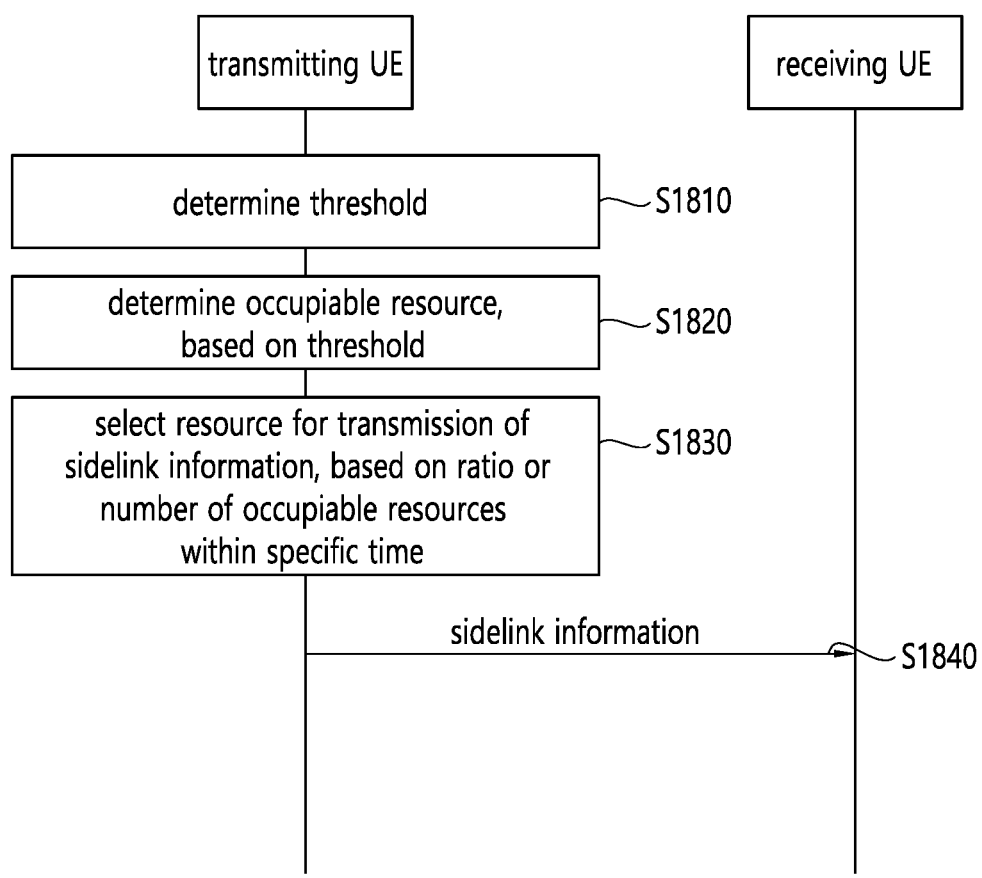
FIG. 18 shows a procedure of limiting resource occupancy of a transmitting UE, according to an embodiment of the present disclosure.

FIG. 18 shows a procedure of limiting resource occupancy of a transmitting UE, according to an embodiment of the present disclosure.

Referring to FIG. 18, in step S1810, the transmitting UE may determine a threshold. For example, the threshold may be a CCA threshold (e.g., a dynamic CCA threshold or a history-based CCA threshold) determined through embodiments of FIG. 15 to FIG. 17. Alternatively, for example, the threshold may be a configured CCA threshold (e.g., the first CCA threshold) or an absolute CCA threshold (i.e., the second CCA threshold).

In step S1820, the transmitting UE may determine one or more occupiable sub-channels or one or more occupiable resources, based on the threshold. For example, the transmitting UE may determine one or more sub-channels or one or more resources having a good channel state as occupiable sub-channels or occupiable resources.

Figure 19:
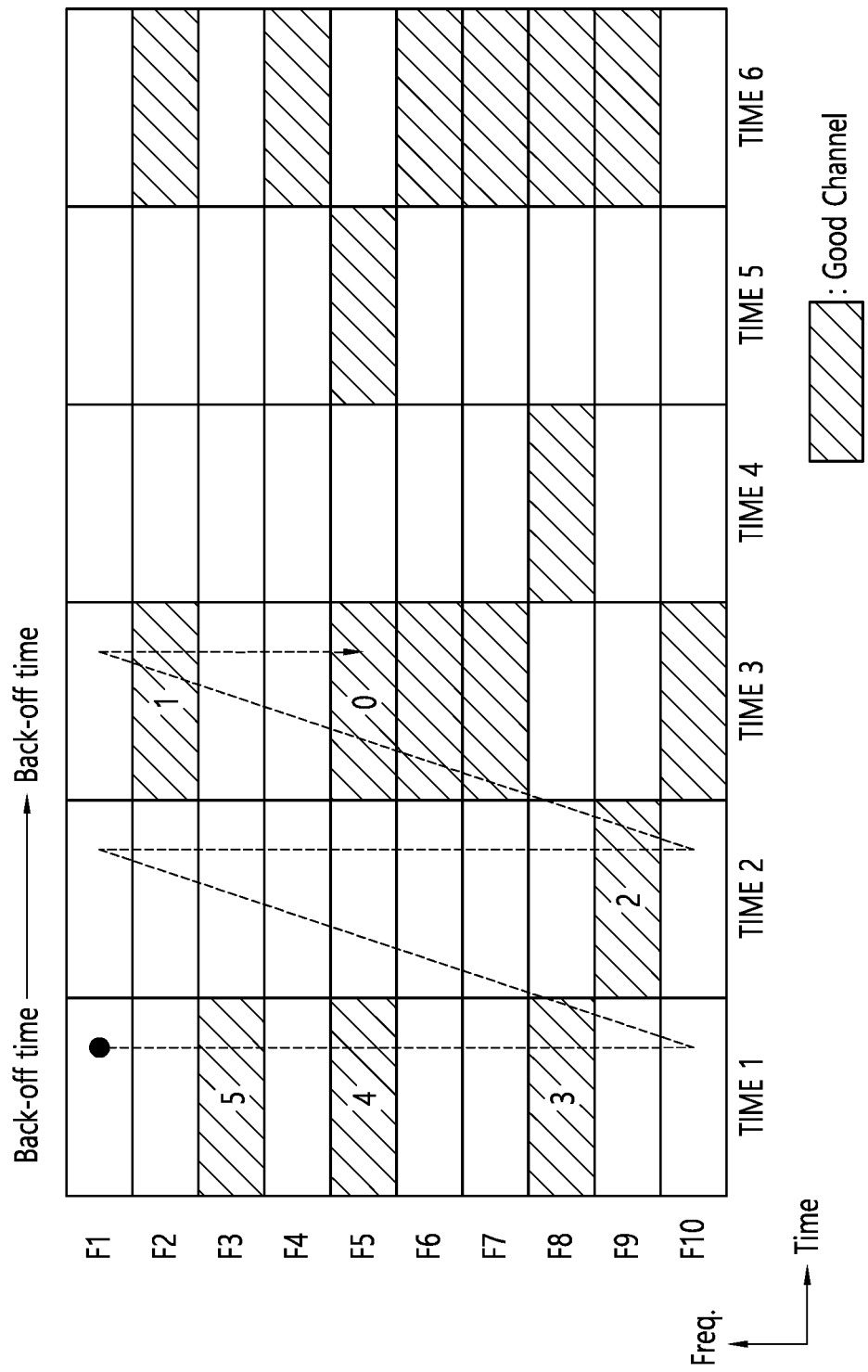
FIG. 19 is a drawing for explaining a problem which may occur when a transmitting UE selects a transmission resource from among occupiable resources.

FIG. 19 is a drawing for explaining a problem which may occur when a transmitting UE selects a transmission resource from among occupiable resources.

Referring to FIG. 19, the transmitting UE may back off a random counter selected by the transmitting UE for an occupiable resource. That is, the transmitting UE may decrease a value of the random counter selected by the transmitting UE for the occupiable resource. However, for example, when a congestion is severe (e.g., when a CBR is higher than a specific value), the UE needs to avoid a time duration in which a plurality of UEs may attempt to occupy a channel, such as a duration TIME2. Hereinafter, a problem which may occur when the UE does not avoid the time duration in which the plurality of UEs may attempt to occupy the channel in the environment where the congestion is severe will be described in detail.

For example, in an embodiment of FIG. 19, it is assumed that the transmitting UE obtains a random counter 6 in order to attempt to occupy a resource in a packet arrival time TIME1 of a packet to be transmitted by the transmitting UE. Then, in the embodiment of FIG. 19, on a sub-channel corresponding to TIME3 of a time axis and F5 of a frequency axis, the random counter will be zero. In this case, the UE may attempt to occupy a resource for which the random counter is zero. Further, the UE may randomly select a resource from among resources that can be sub-occupied in a frequency axis at a timing at which the random counter is zero in order to avoid a resource occupancy collision with another UE. Since the operation in which the UE randomly selects the resource as described above does not have effect on a time delay, it may be an operation necessary to improve performance of the UE. However, the operation of the UE which randomly selects the resource as described above may cause a collision of resource occupancy between a plurality of UEs in a time duration in which the number of occupiable sub-channels is small, such as TIME2, TIME4, or TIME6, which may lead to performance deterioration of a system.

In order to avoid the aforementioned problem, in step S1830, the transmitting UE may select a resource for transmitting sidelink information, based on a ratio or the number of occupiable resources within a specific time. Specifically, according to an embodiment of the present disclosure, the UE may not decrease the value of the random counter in the time duration in which the number of occupiable sub-channels is small. For example, the UE may exclude a time duration in which the number of occupiable sub-channels is small from the back-off time. For example, the time duration in which the number of occupiable sub-channels is small may be a time duration in which the number of occupiable sub-channels is less than a specific count N. For example, the time duration in which the number of occupiable sub-channels is small may be a time duration in which the number of occupiable sub-channels against the total sub-channels is less than a specific ratio R. For example, the total number of sub-channels may be the total number of sub-channels in a resource pool. For example, the total number of sub-channels may be the total number of sub-channels in the entire frequency band.

For example, the specific count N or the specific ratio R may be pre-defined for the UE. Alternatively, for example, a base station may configure the specific count N or the specific ratio R for the UE. Alternatively, for example, the base station may pre-configure the specific count N or the specific ratio R for the UE. For example, the specific count N or the specific ratio R may be a common configuration which is commonly used by all UEs in the resource pool. For example, the specific count N or the specific ratio R may be a dedicated configuration which is configured individually for each UE. In addition, for example, the specific count N or the specific ratio R may be related to an importance (e.g., a ProSe Per-Packet Priority (PPPP), a ProSe Per-Packet Reliability (PPPR), or a latency requirement)) of a packet to be transmitted. For example, the specific count N or the specific ratio R may be configured to different values according to the importance (e.g., the PPPP, the PPPR, or the latency requirement) of the packet to be transmitted by the transmitting UE. For example, a specific count N or specific ratio R related to a packet having a low PPPP (i.e., a packet having a high priority) may have a smaller value than a specific count N or specific ratio R related to a packet having a high PPPP (i.e., a packet having a low priority).

Figure 20:
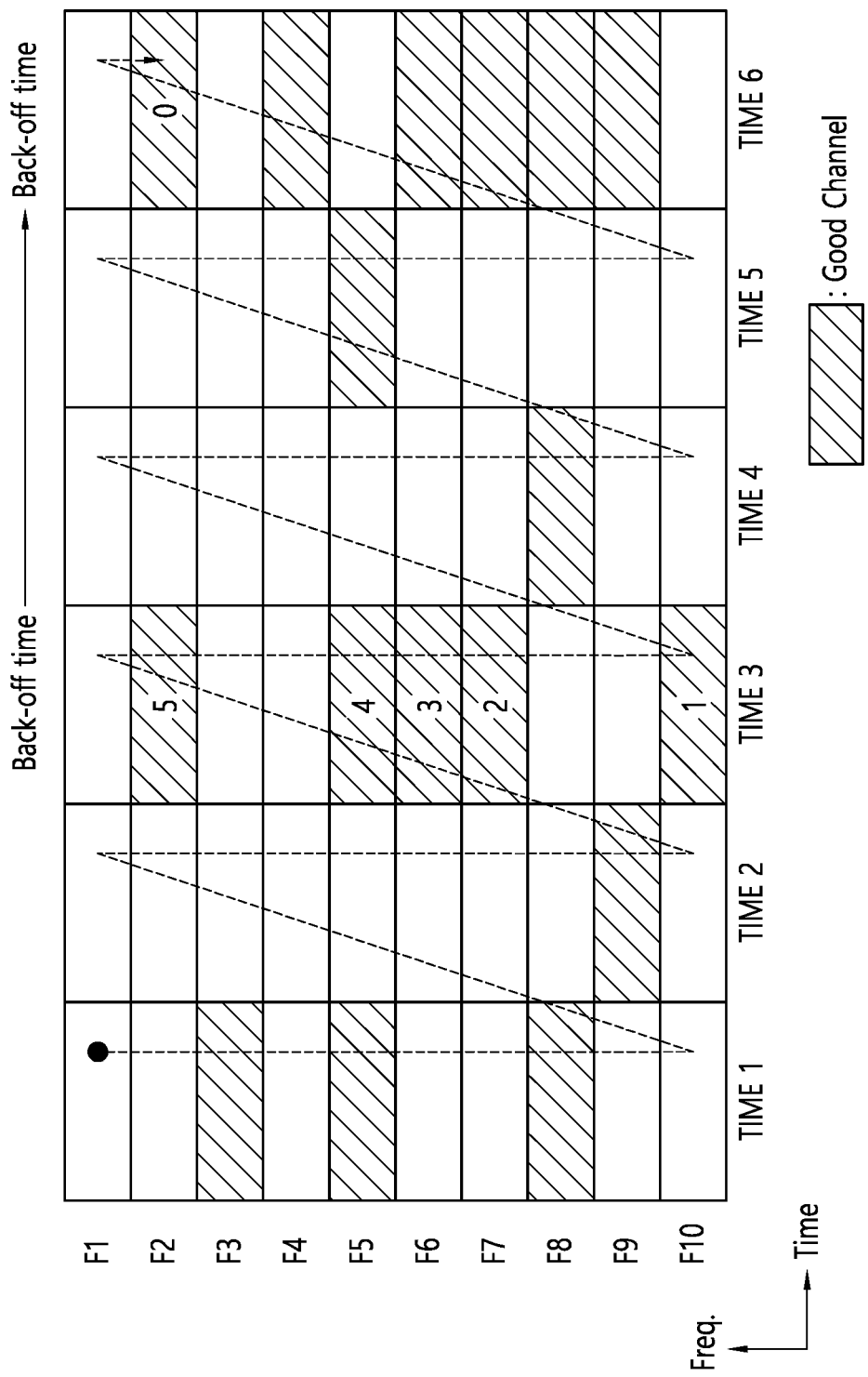
FIG. 20 shows an example of selecting a transmission resource from among resources that can be occupied by a transmitting UE, according to an embodiment of the present disclosure.

FIG. 20 shows an example of selecting a transmission resource from among resources that can be occupied by a transmitting UE, according to an embodiment of the present disclosure.

Referring to FIG. 20, it is assumed that the specific ratio R is 50%. Then, a time duration in which the UE decreases a value of a random counter may be TIME3 and TIME6. That is, the UE may not decrease the value of the random counter at TIME1, TIME2, TIME4, and TIME6. If it is assumed that the transmitting UE obtains a random counter 6 to attempt resource occupancy at a packet arrival time TIME1 of a packet to be transmitted by the transmitting UE, in an embodiment of FIG. 20, the random count will be zero on a sub-channel corresponding to TIME6 of a time axis and F2 of a frequency axis. Therefore, in a time duration in which the number of occupiable sub-channels is small, such as TIME1, TIME2, TIME4, or TIME5, a collision may not occur for resource occupancy between a plurality of UEs.

However, when all UEs perform the operation proposed in step S1830, more collisions may occur for resource occupancy since all of the UEs similarly attempt to occupy a resource on a time duration in which there are many occupiable sub-channels. Therefore, it may not be necessary for all of the UEs to perform the operation proposed in step S1830. In order to solve the aforementioned problem, the UE may determine whether to perform the operation proposed in step S1830 according to an importance (e.g., a PPPP, a PPPR, or a latency requirement) of a packet to be transmitted by the UE. Alternatively, the UE may differently apply the specific count N or the specific ratio R according to the importance (e.g., the PPPP, the PPPR, or the latency requirement) of the packet to be transmitted by the UE.

For example, when a service related to the packet to be transmitted by the UE requires a low latency and a high reliability, the UE may not perform the operation proposed in step S1830 with respect to the packet. Therefore, a latency for the packet may be reduced. Alternatively, when the service related to the PPPP of the packet transmitted by the UE requires the low latency or the high reliability, the UE may configure the specific count N or specific ratio R, which can be known through the PPPP or the packet, to be low. Therefore, the UE may attempt to back off a random counter in more time durations, and the latency for the packet may be reduced.

Figure 21:
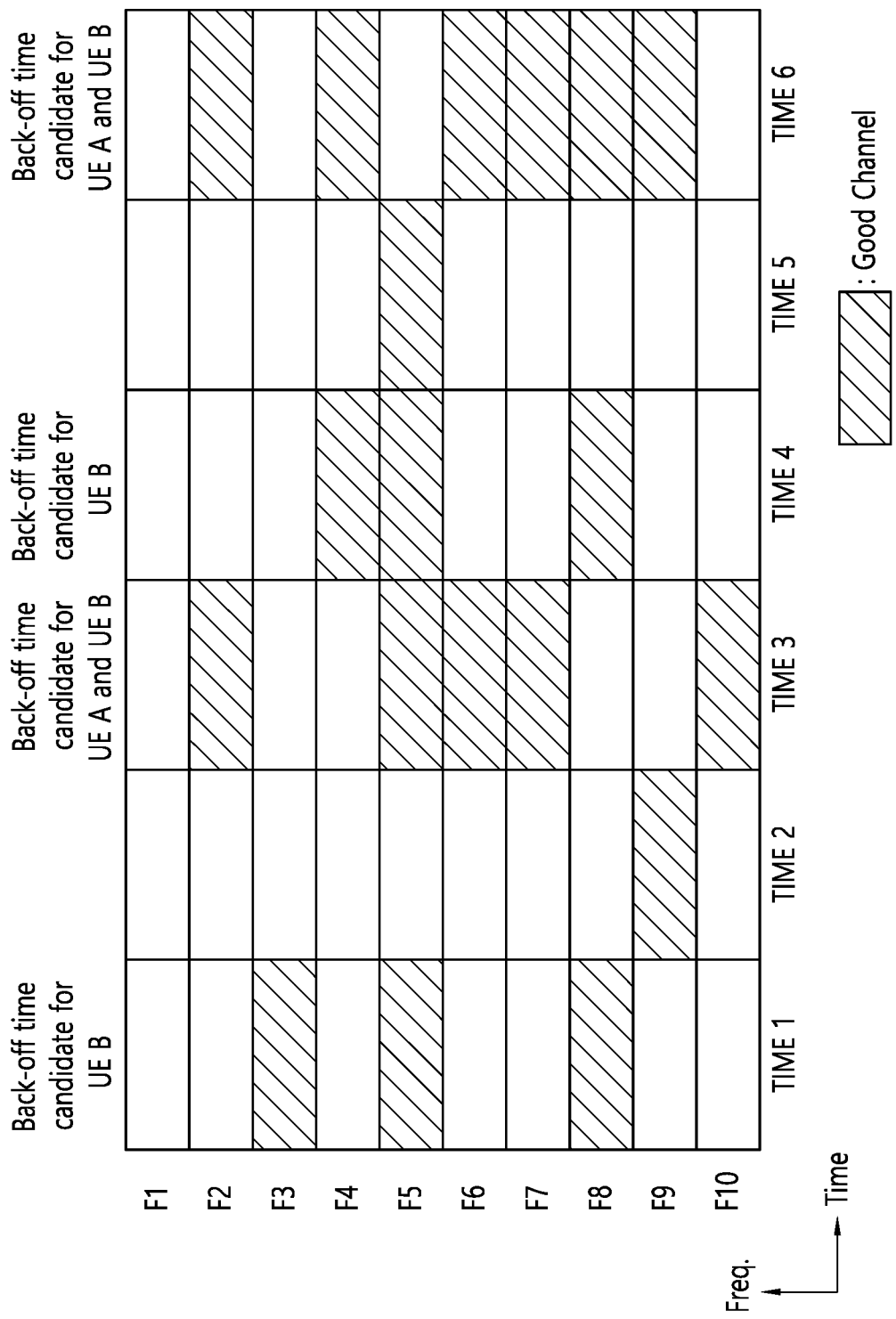
FIG. 21 shows an example of selecting a transmission resource from among resources that can be occupied by a plurality of transmitting UEs, according to an embodiment of the present disclosure.

FIG. 21 shows an example of selecting a transmission resource from among resources that can be occupied by a plurality of transmitting UEs, according to an embodiment of the present disclosure.

Referring to FIG. 21, a back-off available timing may be different according to an importance (e.g., a PPPP, a PPPR, or a latency requirement) of a packet to be transmitted by a UE. That is, a time duration in which a value of a random counter can be decreased may be different according to the importance (e.g., the PPPP, the PPPR, or the latency requirement) of the packet to be transmitted by the UE. For example, in an embodiment of FIG. 21, if it is assumed that a specific count N for a UE A is 5 and a specific count N for a UE B is 3, the UE A may decrease the value of the random counter at TIME3 and TIME6, and the UE B may decrease the value of the random counter at TIME1, TIME3, TIME4, and TIME6. Through such an operation of the UE, a timing capable of decreasing the value of the random counter (i.e., a back-off decreasing timing) may be adjusted according to the importance of the packet to be transmitted. Further, a plurality of sub-channels that can be occupied by a plurality of UEs in a specific time duration may be occupied in a distributed manner.

Returning to FIG. 18, in step S1840, the transmitting UE may transmit sidelink information by using a selected resource.

A method in which a transmitting UE occupies a resource autonomously in a multi-channel CSMA manner in an NR V2X system is proposed above. However, the method is also applicable to not only the transmitting UE but also a receiving UE. For example, various services may be supported in NR V2X according to quality between links. For example, not only sidelink communication for the purpose of providing a broadcast-based safety service but also sidelink communication for the purpose of exchanging a unicast or groupcast-based specific service between links may be supported in the NR V2X. Herein, for example, in case of unicast, an operation for the setup of the unicast link may be required between specific links. In addition, for the setup of the unicast link, the transmitting UE and the receiving UE may exchange a plurality of pieces of information (e.g., a requested service, a requested quality of service (QoS), a sidelink capability, connection information, etc.). In addition, from a perspective of resource occupancy, a resource occupancy situation, a timing or location of an occupiable resource, an interference level of a resource, or the like may be necessarily shared between UEs. If the aforementioned information is not shared in the resource occupancy situation, a UE which performs the broadcast-based V2X communication may attempt to occupy resources which collide with each other. In addition, if the aforementioned information is not shared in the resource occupancy situation, UEs which have perform the unicast or groupcast-based V2X communication may occupy a resource which cannot satisfy a requested QoS level.

In order to share the information for resource occupancy between the UEs, not only the transmitting UE but also the receiving UE may request for information for link setup or resource allocation. In addition, the receiving UE may use the multi-channel CSMA scheme to report an available resource and/or timing to a base station or neighboring UEs. More specifically, for example, the receiving UE may perform CCA with a CCA threshold derived through the proposed scheme in a current or specific time window, and may report an available resource and/or timing to the base station or the neighboring UEs. In this process, the CCA threshold may be updated every time or for each specific window according to the proposed scheme. After performing the CCA based on the threshold, the UE may notify information on a channel state measured in a resource of a specific timing. Alternatively, the UE may notify information on a channel state measured in all resources within a specific time window. When the UE configures information on an available resource, the UE may indicate whether a corresponding resource (e.g., a sub-channel) is available or unavailable through a bitmap (e.g., 0 or 1). Alternatively, when the UE configures the information on the available resource, the UE may indicate this through an index of an available/unavailable sub-channel set.

In addition, in case of current Wi-Fi (i.e., IEEE 802.11), in communication between an AP and a specific UE, a ready to send (RTS)/clear to send (CTS) may be signaled to avoid a channel occupancy collision with another UE. Also in unicast and/or groupcast communication of NR V2X, UEs may exchange information similar to the RTS/CRS signal based on the proposed multi-channel CSMA, and thus the UEs may more effectively share a channel. For example, when the transmitting UE transmits a unicast request message or a groupcast request message, the receiving UE corresponding to the request message may feed back a CTS-related message. In this case, when the receiving UE configures the CTS-related message, the receiving UE may monitor a resource in advance as in the proposed scheme, and may allow information on an available resource (e.g., a resource capable of satisfying QoS of a unicast service) to be included in the CTS-related message. Accordingly, a resource capable of satisfying QoS of a service in a corresponding link may be occupied. In addition, according to an importance of the service, the receiving UE may allow information indicating that a corresponding resource is used for a specific duration to be included in the CTS-related message, so that other UEs are not allowed to use a resource which is fed back through CTS after the monitoring. Through the aforementioned operation, other UEs which have received the CTS-related message may occupy other resources by avoiding a resource indicated by the CTS-related message. Accordingly, a resource collision can be avoided.

Figure 22:
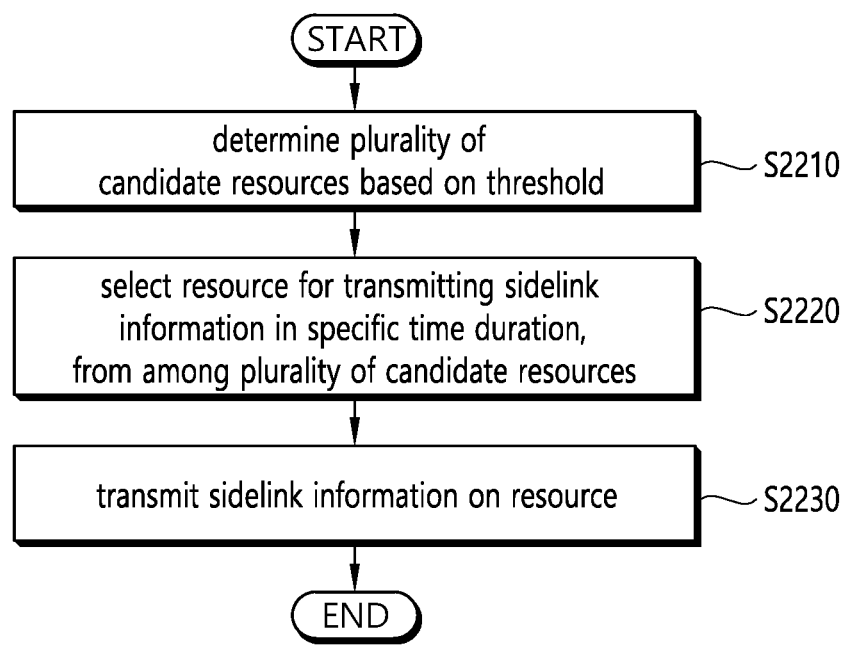
FIG. 22 shows a method of transmitting sidelink information by a first apparatus 100 according to an embodiment of the present disclosure.

FIG. 22 shows a method of transmitting sidelink information by a first apparatus 100 according to an embodiment of the present disclosure.

Referring to FIG. 22, in step S2210, the first apparatus 100 may determine a plurality of candidate resources, based on a threshold. The threshold may be determined or configured by various methods proposed in the present specification. For example, additionally, the first apparatus 100 may determine a first threshold, based on a channel measurement result, and may determine a greater value between the first threshold and a second threshold as the threshold. For example, the second threshold may be received from a base station. For example, the second threshold may be pre-defined for the first apparatus 100. The plurality of candidate resources may be a resource of which a channel state measured by the first apparatus 100 is greater than or equal to or exceeds the threshold.

In step S2220, the first apparatus 100 may select a resource for transmitting the sidelink information in a specific time duration, from among the plurality of candidate resources. The resource may be selected by various methods proposed in the present specification. The resource for transmitting the sidelink information may be a resource located on a time at which a value of a random counter selected by the first apparatus 100 is zero. Additionally, the first apparatus 100 may decrease the value of the random counter in the specific time duration. For example, the value of the random counter may not be decreased in a time duration other than the specific time duration.

The specific time duration may be a time duration in which the number of candidate resources that can be occupied by the first apparatus 100 is greater than or equal to or exceeds a specific number. For example, the specific number may be determined based on a priority of the sidelink information. For example, the specific number may be determined to a small value if the priority of the sidelink information is high.

The specific time duration may be a time duration in which a ratio of the number of candidate resources that can be occupied by the first apparatus 100 against the total number of resources is greater than or equal to or exceeds a specific ratio. For example, the specific ratio may be determined based on the priority of the sidelink information. For example, the specific ratio may be determined to a small value if the priority of the sidelink information is high.

In step S2230, the first apparatus 100 may transmit the sidelink information on the resource. The first apparatus 100 communicates with at least any one of autonomous vehicles other than a mobile UE, a network, or the first apparatus 100.

The proposed method may be performed by various devices described in the present specification. For example, a processor 102 of the first apparatus 100 may determine a plurality of candidate resources, based on a threshold. In addition, the processor 102 of the first apparatus 100 may select a resource for transmitting the sidelink information in a specific time duration, from among the plurality of candidate resources. In addition, the processor 102 of the first apparatus 100 may control a transceiver 106 to transmit the sidelink information on the resource.

According to an embodiment of the present disclosure, in sidelink communication or V2X communication, a UE can effectively occupy a resource.

Since the examples of the above-described proposed method may also be included as one of the implementation methods of the present disclosure, it will be apparent that the examples of the above-described proposed method can be considered as types of proposed methods. Additionally, although the above-described proposed methods may be independently implemented (or embodied), the implementation may also be carried out in a combined (or integrated) form of part of the proposed methods. Herein, rules may be defined so that information on the application or non-application of the proposed methods (or information on the rules of the proposed methods) can be notified to a UE, by a base station, or to a receiving UE, by a transmitting UE, through a predefined signal (e.g., physical layer signal or high layer signal).

Hereinafter, an apparatus to which the present disclosure can be applied will be described.

The various descriptions, functions, procedures, proposals, methods, and/or operational flowcharts of the present disclosure described in this document may be applied to, without being limited to, various fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 23:
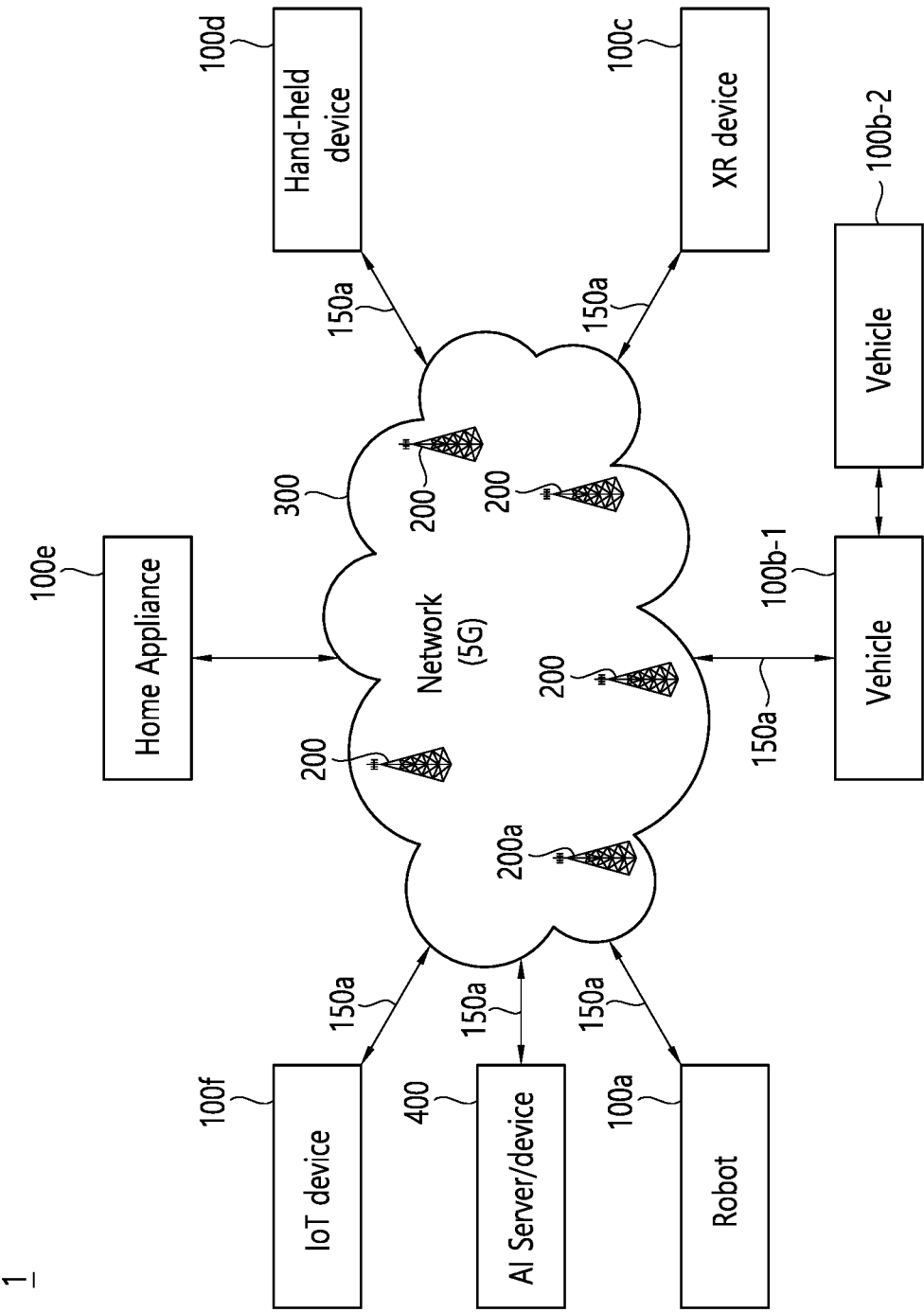
FIG. 23 shows a communication system (1) applied to the present disclosure.

FIG. 23 shows a communication system (1) applied to the present disclosure.

Referring to FIG. 23, a communication system (1) applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b) may be established between the wireless devices (100a~100f)/BS (200), or BS (200)/wireless devices (100a~100f). Herein, the wireless communication/connections (150a, 150b) may be established through various RATs (e.g., 5G NR) such as uplink/downlink communication (150a), sidelink communication (150b) (or, D2D communication), or inter BS communication (e.g., relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 24:
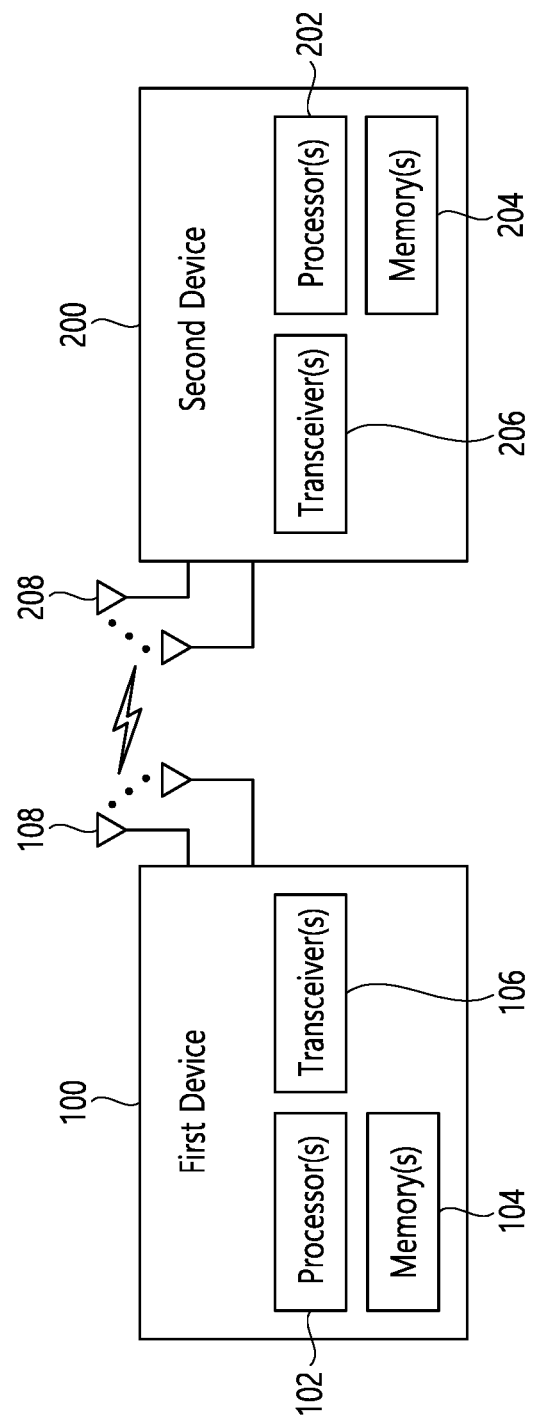
FIG. 24 shows wireless devices applicable to the present disclosure.

FIG. 24 shows wireless devices applicable to the present disclosure.

Referring to FIG. 24, a first wireless device (100) and a second wireless device (200) may transmit radio signals through various RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 23.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store various information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Units (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 25:
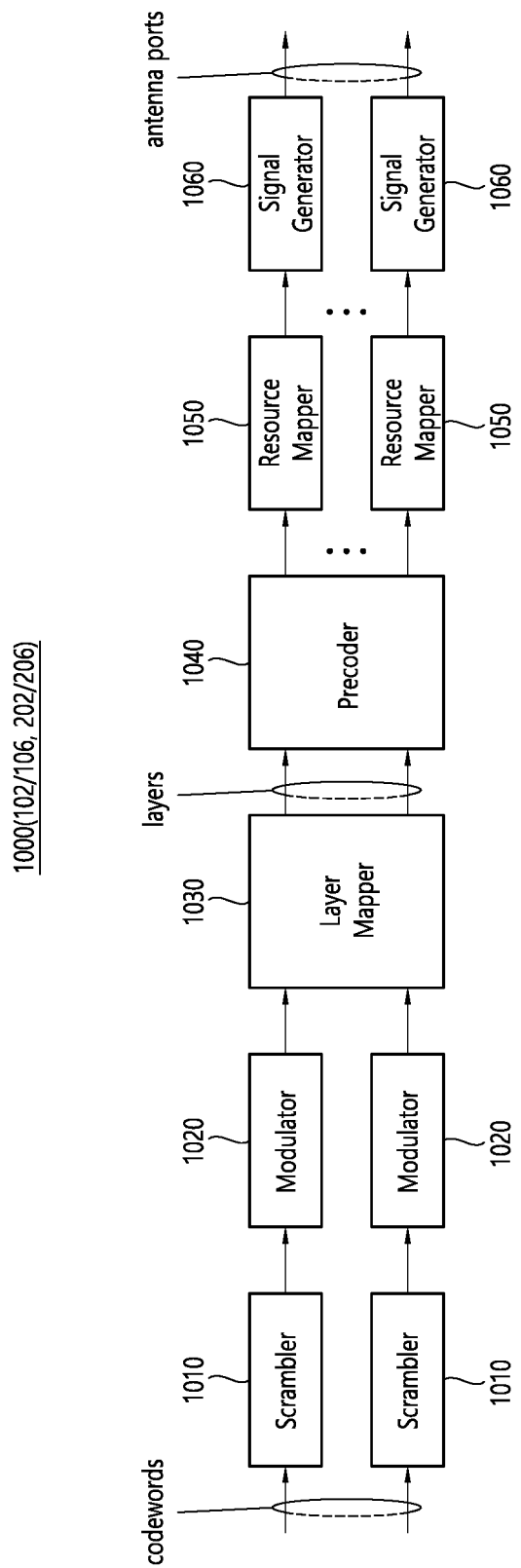
FIG. 25 shows a signal process circuit for a transmission signal.

FIG. 25 shows a signal process circuit for a transmission signal.

Referring to FIG. 25, a signal processing circuit (1000) may include scramblers (1010), modulators (1020), a layer mapper (1030), a precoder (1040), resource mappers (1050), and signal generators (1060). An operation/function of FIG. 25 may be performed, without being limited to, the processors (102, 202) and/or the transceivers (106, 206) of FIG. 24. Hardware elements of FIG. 25 may be implemented by the processors (102, 202) and/or the transceivers (106, 206) of FIG. 24. For example, blocks 1010~1060 may be implemented by the processors (102, 202) of FIG. 24. Alternatively, the blocks 1010 to 1050 may be implemented by the processors (102, 202) of FIG. 24 and the block 1060 may be implemented by the transceivers (106, 206) of FIG. 24.

Codewords may be converted into radio signals via the signal processing circuit (1000) of FIG. 25. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 25. For example, the wireless devices (e.g., 100, 200 of FIG. 24) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 26:
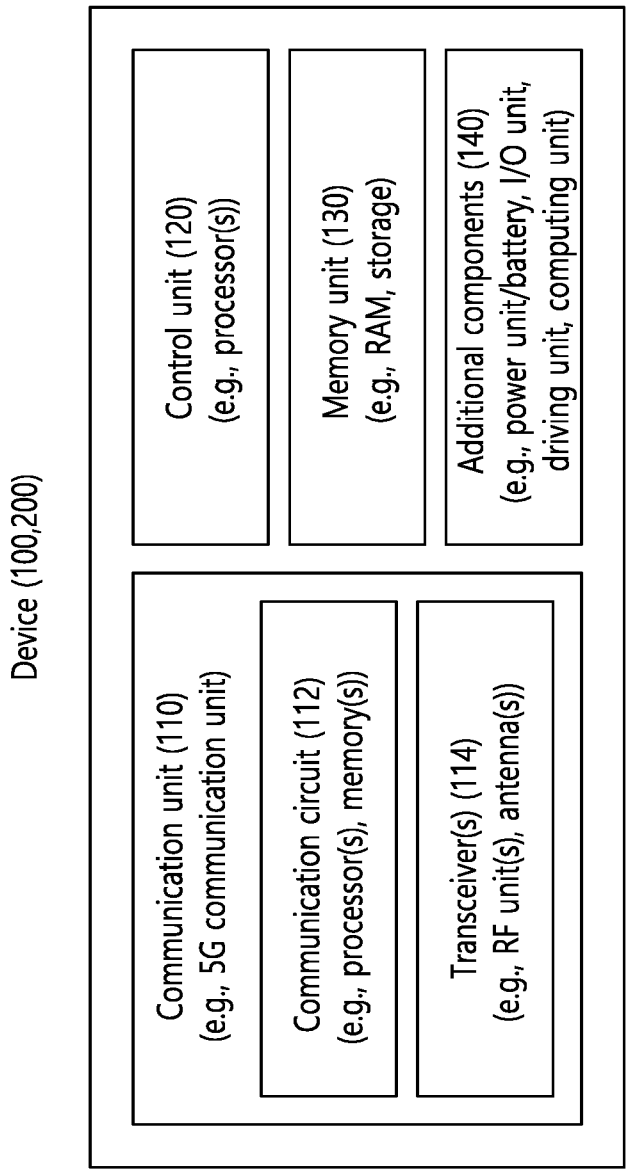
FIG. 26 shows another example of a wireless device applied to the present disclosure.

FIG. 26 shows another example of a wireless device applied to the present disclosure. The wireless device may be implemented in various forms according to a use-case/service (refer to FIG. 23 and FIGS. 26 to 31).

Referring to FIG. 26, wireless devices (100, 200) may correspond to the wireless devices (100, 200) of FIG. 24 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 24. For example, the transceiver(s) (114) may include the one or more transceivers (106, 206) and/or the one or more antennas (108, 208) of FIG. 24. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100*a* of FIG. 23), the vehicles (100*b*-1, 100*b*-2 of FIG. 23), the XR device (100*c* of FIG. 23), the hand-held device (100*d* of FIG. 23), the home appliance (100*e* of FIG. 23), the IoT device (100*f* of FIG. 23), a digital broadcast terminal (or UE), a hologram device, a public safety device, an MTC device, a medicine device, a fintech device (or a finance device), a security device, a climate/environment device, the AI server/device (400 of FIG. 23), the BSs (200 of FIG. 23), a network node, and so on. The wireless device may be used in a mobile or fixed place according to a use-example/service.

In FIG. 26, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof Hereinafter, an example of implementing FIG. 26 will be described in detail with reference to the drawings.

Figure 27:
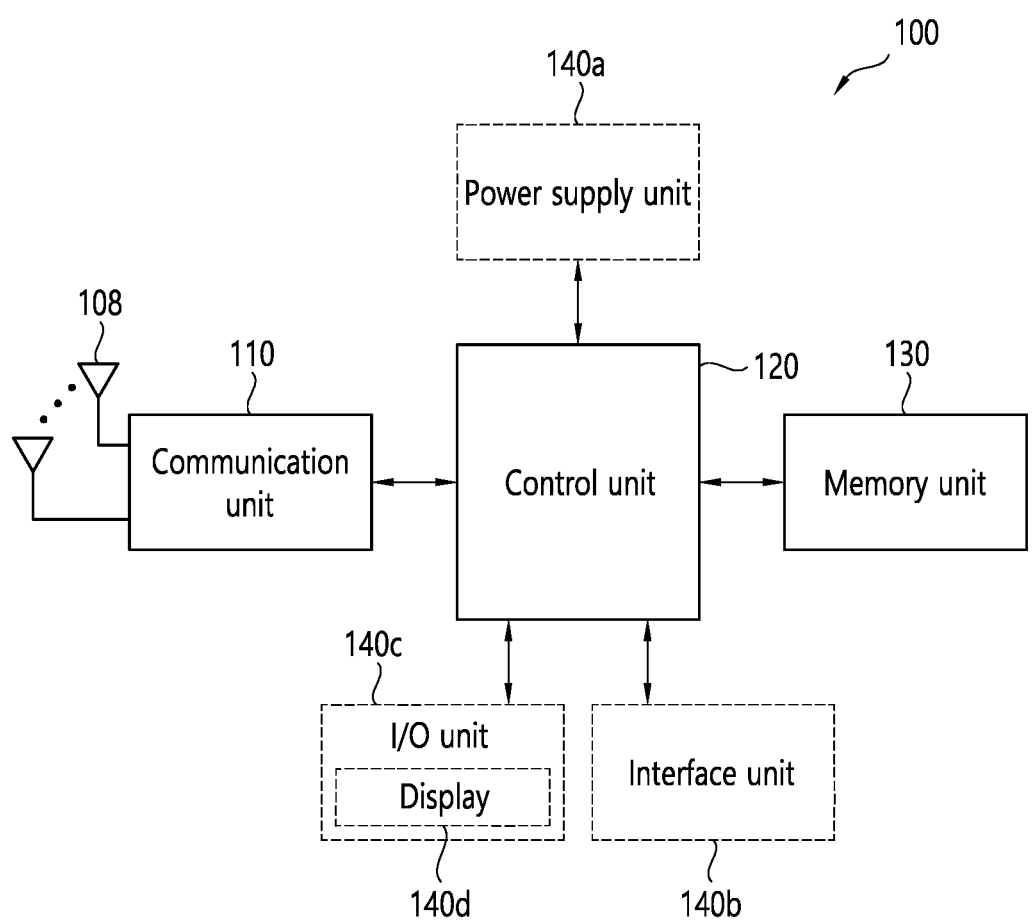
FIG. 27 shows a hand-held device applied to the present disclosure.

FIG. 27 shows a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 27, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 26, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 28:
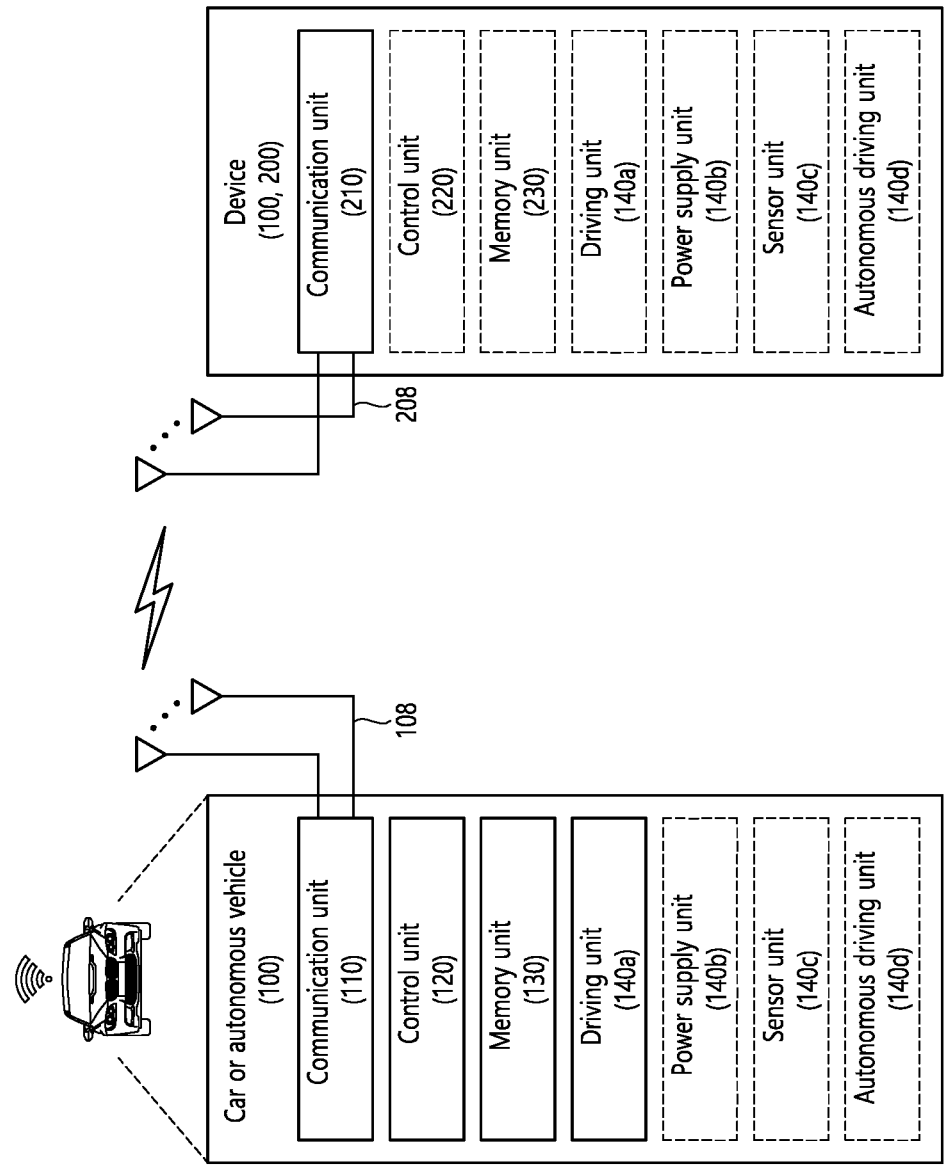
FIG. 28 shows a vehicle or an autonomous driving vehicle applied to the present disclosure.

FIG. 28 shows a vehicle or an autonomous driving vehicle applied to the present disclosure. The vehicle or autonomous driving vehicle may be implemented by a mobile robot, a car, a train, a manned/unmanned Aerial Vehicle (AV), a ship, and so on.

Referring to FIG. 28, a vehicle or autonomous driving vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 26, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous driving vehicle (100). The control unit (120) may include an Electronic Control Unit (ECU). The driving unit (140a) may cause the vehicle or the autonomous driving vehicle (100) to drive on a road. The driving unit (140a) may include an engine, a motor, a powertrain, a wheel, a brake, a steering device, and so on. The power supply unit (140b) may supply power to the vehicle or the autonomous driving vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous driving vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous driving vehicles and provide the predicted traffic information data to the vehicles or the autonomous driving vehicles.

Figure 29:
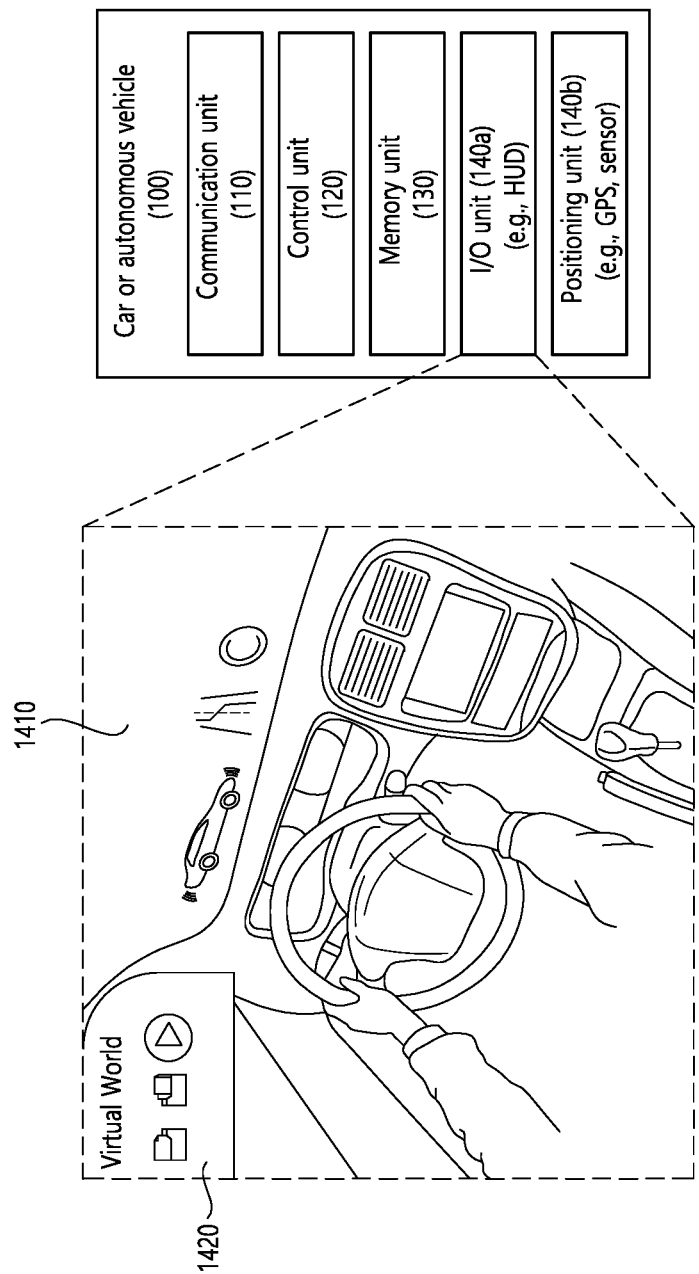
FIG. 29 shows a vehicle applied to the present disclosure.

FIG. 29 shows a vehicle applied to the present disclosure. The vehicle may be implemented as a transport means, an aerial vehicle, a ship, and so on.

Referring to FIG. 29, a vehicle (100) may include a communication unit (110), a control unit (120), a memory unit (130), an I/O unit (140a), and a positioning unit (140b). Herein, the blocks 110 to 130/140a~140b correspond to blocks 110 to 130/140 of FIG. 26.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140*a*) may output an AR/VR object based on information within the memory unit (130). The I/O unit (140*a*) may include a HUD. The positioning unit (140*b*) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140*b*) may include a GPS and various sensors.

As an example, the communication unit (110) of the vehicle (100) may receive map information and traffic information from an external server and store the received information in the memory unit (130). The positioning unit (140*b*) may obtain the vehicle position information through the GPS and various sensors and store the obtained information in the memory unit (130). The control unit (120) may generate a virtual object based on the map information, traffic information, and vehicle position information and the I/O unit (140*a*) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140*a*). In addition, the control unit (120) may broadcast a warning message regarding driving abnormity to neighboring vehicles through the communication unit (110). According to situation, the control unit (120) may transmit the vehicle position information and the information on driving/vehicle abnormality to related organizations.

Figure 30:
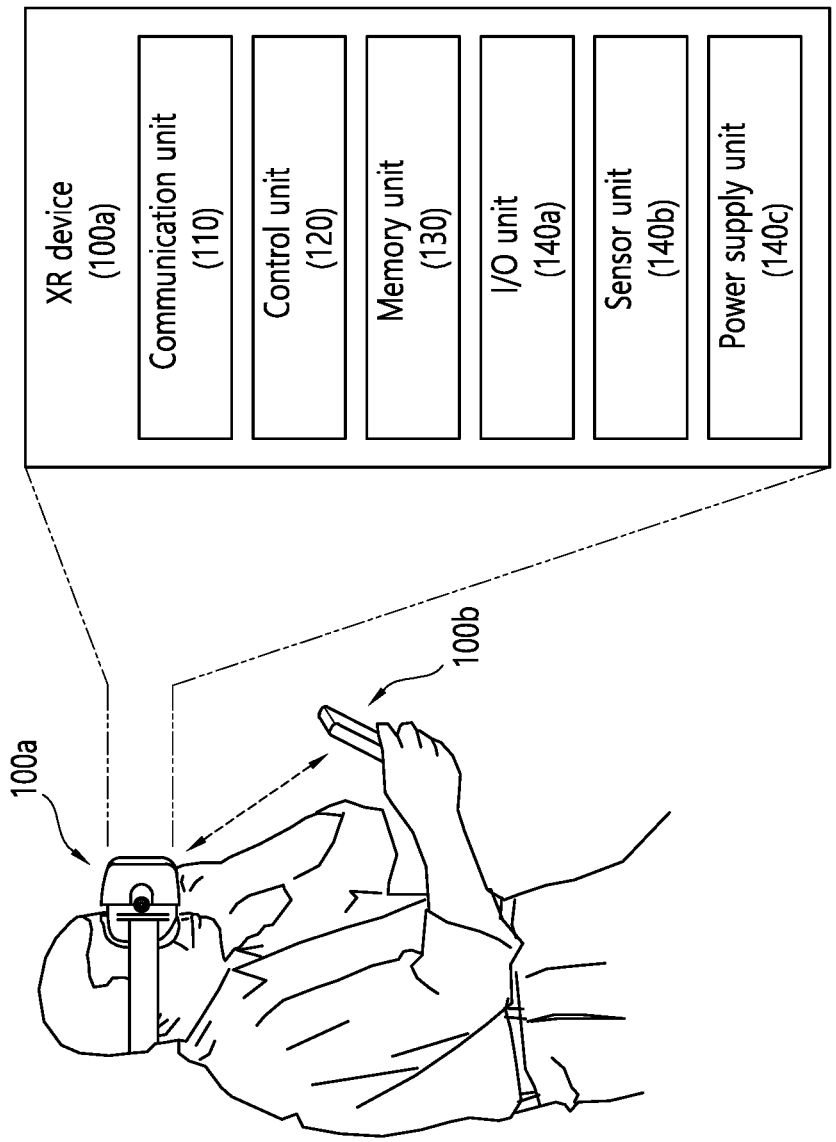
FIG. 30 shows an XR device applied to the present disclosure.

FIG. 30 shows an XR device applied to the present disclosure. The XR device may be implemented by an HMD, a HUD mounted in a vehicle, a television, a smartphone, a computer, a wearable device, a home appliance, a digital signage, a vehicle, a robot, and so on.

Referring to FIG. 30, an XR device (100*a*) may include a communication unit (110), a control unit (120), a memory unit (130), an I/O unit (140*a*), a sensor unit (140*b*), and a power supply unit (140*c*). Herein, the blocks 110 to 130/140*a*~140*c* correspond to the blocks 110 to 130/140 of FIG. 26, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100*a*). For example, the control unit (120) may be configured to control and/or perform procedures such as video/image acquisition, (video/image) encoding, and metadata generation and processing. The memory unit (130) may store data/parameters/programs/code/commands needed to drive the XR device (100*a*)/generate XR object. The I/O unit (140*a*) may obtain control information and data from the exterior and output the generated XR object. The I/O unit (140*a*) may include a camera, a microphone, a user input unit, a display unit, a speaker, and/or a haptic module. The sensor unit (140*b*) may obtain an XR device state, surrounding environment information, user information, and so on. The sensor unit (140*b*) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140*c*) may supply power to the XR device (100*a*) and include a wired/wireless charging circuit, a battery, and so on.

For example, the memory unit (130) of the XR device (100*a*) may include information (e.g., data) needed to generate the XR object (e.g., an AR/VR/MR object). The I/O unit (140*a*) may receive a command for manipulating the XR device (100*a*) from a user and the control unit (120) may drive the XR device (100*a*) according to a driving command of a user. For example, when a user desires to watch a film or news through the XR device (100*a*), the control unit (120) transmits content request information to another device (e.g., a hand-held device (100*b*)) or a media server through the communication unit (130). The communication unit (130) may download/stream content such as films or news from another device (e.g., the hand-held device (100*b*)) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140*a*)/sensor unit (140*b*).

The XR device (100*a*) may be wirelessly connected to the hand-held device (100*b*) through the communication unit (110) and the operation of the XR device (100*a*) may be controlled by the hand-held device (100*b*). For example, the hand-held device (100*b*) may operate as a controller of the XR device (100*a*). To this end, the XR device (100*a*) may obtain information on a 3D position of the hand-held device (100*b*) and generate and output an XR object corresponding to the hand-held device (100*b*).

Figure 31:
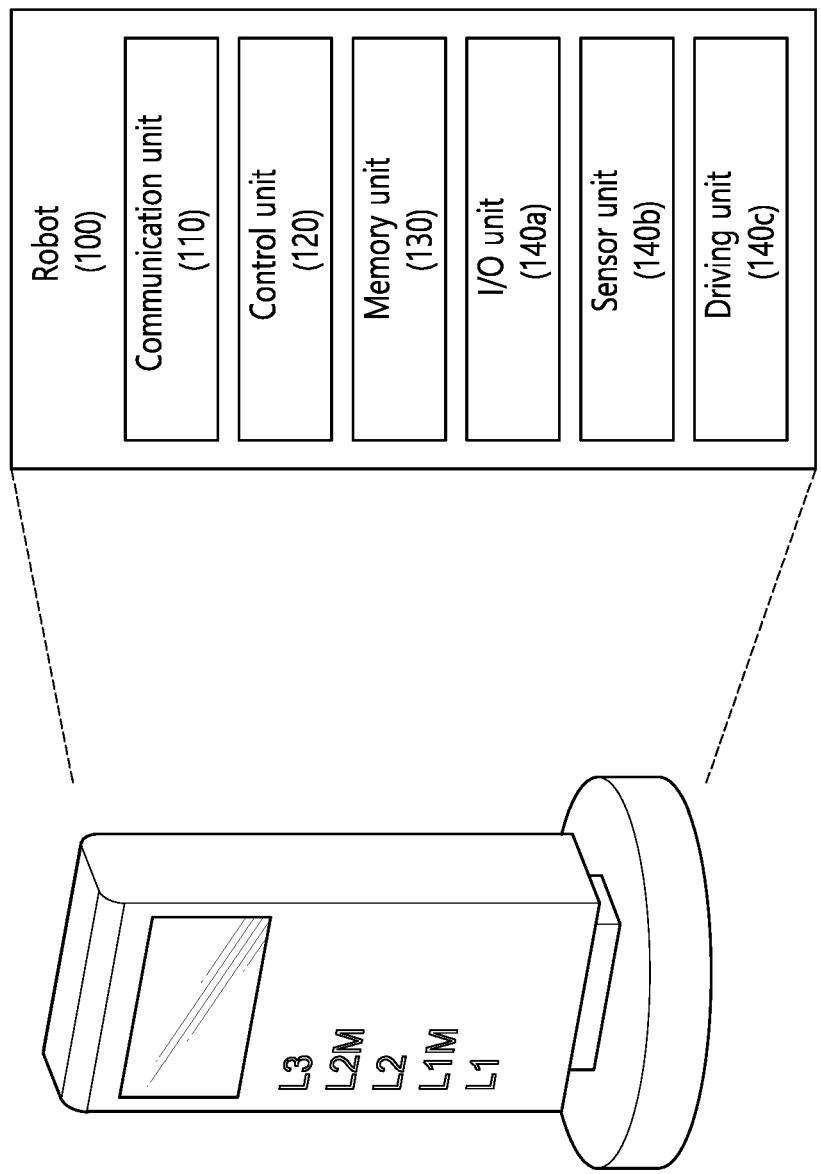
FIG. 31 shows a robot applied to the present disclosure.

FIG. 31 shows a robot applied to the present disclosure. The robot may be categorized into an industrial robot, a medical robot, a household robot, a military robot, and so on, according to a used purpose or field.

Referring to FIG. 31, a robot (100) may include a communication unit (110), a control unit (120), a memory unit (130), an I/O unit (140*a*), a sensor unit (140*b*), and a driving unit (140*c*). Herein, the blocks 110 to 130/140*a*-140*c* correspond to the blocks 110 to 130/140 of FIG. 26, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140*a*) may obtain information from the exterior of the robot (100) and output information to the exterior of the robot (100). The I/O unit (140*a*) may include a camera, a microphone, a user input unit, a display unit, a speaker, and/or a haptic module. The sensor unit (140*b*) may obtain internal information of the robot (100), surrounding environment information, user information, and so on. The sensor unit (140*b*) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140*c*) may perform various physical operations such as movement of robot joints. In addition, the driving unit (140*c*) may cause the robot (100) to travel on the road or to fly. The driving unit (140*c*) may include an actuator, a motor, a wheel, a brake, a propeller, and so on.

Figure 32:
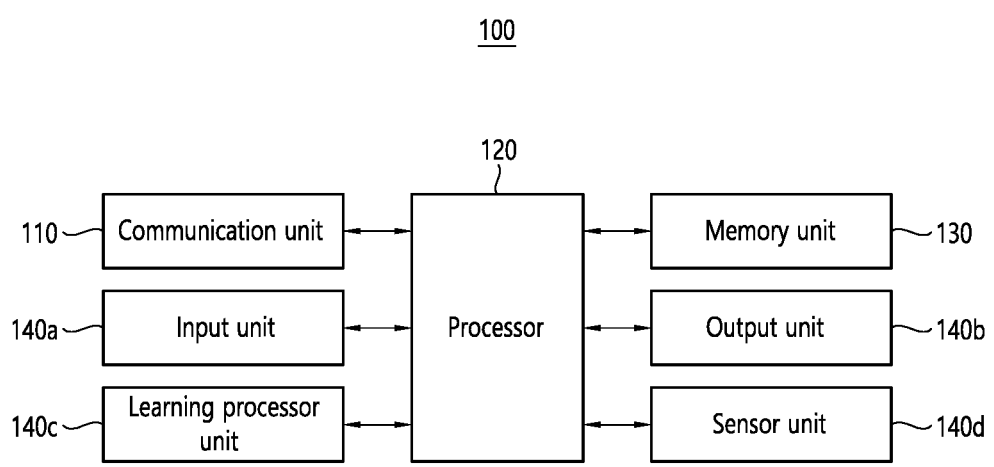
FIG. 32 shows an AI device applied to the present disclosure.

FIG. 32 shows an AI device applied to the present disclosure. The AI device may be implemented by a fixed device or a mobile device, such as a TV, a projector, a smartphone, a PC, a notebook, a digital broadcast terminal (or UE), a tablet PC, a wearable device, a Set Top Box (STB), a radio, a washing machine, a refrigerator, a digital signage, a robot, a vehicle, and so on.

Referring to FIG. 32, an AI device (100) may include a communication unit (110), a control unit (120), a memory unit (130), an I/O unit (140a/140b), a learning processor unit (140c), and a sensor unit (140d). The blocks 110 to 130/140a~140d correspond to blocks 110 to 130/140 of FIG. 26, respectively.

The communication unit (110) may transmit and receive wired/radio signals (e.g., sensor information, user input, learning models, or control signals) to and from external devices such as other AI devices (e.g., 100x, 200, 400 of FIG. 23) or an AI server (200) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 23). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 23). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

What is claimed is:

1. A method performed by a first device in a wireless communication system, the method comprising:
   receiving, from a second device, first information for requesting a set of non-preferred resources, wherein the first information for requesting the set of non-preferred resources includes quality of service (QoS) information;
   determining the set of non-preferred resources based on the QoS information; and
   transmitting, to the second device, second information including the set of non-preferred resources.

2. The method of claim 1,
   wherein the set of non-preferred resources includes a resource used for the first device to perform sidelink communication.

3. The method of claim 1,
   wherein the set of non-preferred resources includes a resource which is determined based on a service priority monitored by the first device.

4. The method of claim 1,
   wherein the set of non-preferred resources includes a resource in which the first device does not expect to perform sidelink reception.

5. The method of claim 1,
   wherein the second information including the set of non-preferred resources is transmitted to the second device such that the second device excludes the set of non-preferred resources in resource selection.

6. A first device adapted to perform wireless communication, the first device comprising:
   at least one transceiver;
   at least one processor; and
   at least one memory connected to the at least one processor and storing instructions that, based on being executed, cause the first device to perform operations comprising:
   receiving, from a second device, first information for requesting a set of non-preferred resources, wherein the first information for requesting the set of non-preferred resources includes quality of service (QoS) information;
   determining the set of non-preferred resources based on the QoS information; and
   transmitting, to the second device, second information including the set of non-preferred resources.

* * * * *